US012062328B2

(12) United States Patent
Jung et al.

(10) Patent No.: US 12,062,328 B2
(45) Date of Patent: Aug. 13, 2024

(54) PIXEL DRIVING CIRCUIT AND DISPLAY DEVICE

(71) Applicant: SAPIEN SEMICONDUCTORS INC., Seoul (KR)

(72) Inventors: Jun Young Jung, Seoul (KR); Myunghee Lee, Seoul (KR)

(73) Assignee: SAPIEN SEMICONDUCTORS INC., Seoul (KR)

( * ) Notice: Subject to any disclaimer, the term of this patent is extended or adjusted under 35 U.S.C. 154(b) by 0 days.

(21) Appl. No.: 18/113,852

(22) Filed: Feb. 24, 2023

(65) Prior Publication Data

US 2023/0237956 A1 Jul. 27, 2023

Related U.S. Application Data

(63) Continuation-in-part of application No. 17/942,219, filed on Sep. 12, 2022, now Pat. No. 11,735,106,
(Continued)

(30) Foreign Application Priority Data

Jun. 28, 2018 (KR) ........................ 10-2018-0074941

(51) Int. Cl.
*G09G 3/32* (2016.01)

(52) U.S. Cl.
CPC ........... *G09G 3/32* (2013.01); *G09G 2300/08* (2013.01); *G09G 2310/0289* (2013.01); *G09G 2310/08* (2013.01); *G09G 2330/021* (2013.01)

(58) Field of Classification Search
CPC ....... G09G 2310/0289; G09G 2300/08; G09G 3/32; G09G 2330/021; G09G 2310/08
See application file for complete search history.

(56) References Cited

U.S. PATENT DOCUMENTS

| | | | |
|---|---|---|---|
| 9,990,883 | B2 | 6/2018 | Park et al. |
| 2004/0104686 | A1 | 6/2004 | Shin et al. |

(Continued)

FOREIGN PATENT DOCUMENTS

| | | | |
|---|---|---|---|
| CN | 1534573 | A | 10/2004 |
| CN | 111243505 | A | 6/2020 |

(Continued)

OTHER PUBLICATIONS

Final Office Action issued in prior U.S. Appl. No. 17/047,544 mailed Jul. 16, 2021.

(Continued)

*Primary Examiner* — Muhammad N Edun
(74) *Attorney, Agent, or Firm* — Sughrue Mion, PLLC

(57) ABSTRACT

The present embodiments disclose a pixel driving circuit. A pixel driving circuit according to an embodiment of the present disclosure is electrically connected to a luminous element and comprises a first circuit configured to control light-emission and non-emission of the luminous element in response to a control signal applied to each of a plurality of subframes included in a frame, a second circuit configured to store bit values of multi-bit data in the frame and generate the control signal based on the stored bit values, and a clock signal such that each subframe included in the frame is controlled according to each bit value, and wherein each of the plurality of subframes includes a data-writing period and a light-emitting period, during the data-writing period of each subframe, the second circuit receives and stores a corresponding bit string from among a plurality of bit strings of n-bit data, wherein the plurality of bit strings are generated by a combination of bits in the number of n, which is smaller than m, from among m bits constituting a bit string of the multi-bit data, and the n-bit data is a bit string in which n bits from among the m bits are combined such that a
(Continued)

difference in light-emitting periods of the plurality of sub-frames is minimized.

7 Claims, 21 Drawing Sheets

Related U.S. Application Data which is a continuation of application No. 17/890,737, filed on Aug. 18, 2022, now Pat. No. 11,862,071, which is a continuation-in-part of application No. 17/547,393, filed on Dec. 10, 2021, now Pat. No. 11,482,165, which is a continuation of application No. 17/047,544, filed as application No. PCT/KR2018/009078 on Aug. 9, 2018, now Pat. No. 11,238,783.

(56) References Cited

U.S. PATENT DOCUMENTS

| | | | |
|---|---|---|---|
| 2007/0279359 | A1 | 12/2007 | Yoshida et al. |
| 2009/0218958 | A1 | 9/2009 | Shimizu |
| 2013/0038591 | A1 | 2/2013 | Yang |
| 2018/0182279 | A1 | 6/2018 | Sakariya et al. |
| 2019/0347979 | A1 | 11/2019 | Ahmed |

FOREIGN PATENT DOCUMENTS

| | | | |
|---|---|---|---|
| JP | 2010-276783 | A | 12/2010 |
| KR | 10-2002-0073507 | A | 9/2002 |
| KR | 10-0432554 | | 5/2004 |
| KR | 10-2004-0093504 | A | 11/2004 |
| KR | 10-2004-0111032 | A | 12/2004 |
| KR | 10-2007-0116440 | A | 12/2007 |
| KR | 10-2147402 | B1 | 8/2020 |
| WO | 01/73738 | A1 | 10/2001 |

OTHER PUBLICATIONS

International Search Report for PCT/KR2018/009078 dated Feb. 22, 2019 (PCT/ISA/210).

Non-Final Office Action issued in prior U.S. Appl. No. 17/547,393 on Jul. 13, 2022.

Notice of Allowance issued in prior U.S. Appl. No. 17/047,544 mailed Sep. 24, 2021.

Office Action issued in prior U.S. Appl. No. 17/047,544 mailed Mar. 31, 2021.

Office Action issued in parent U.S. Appl. No. 17/942,219 mailed Jan. 13, 2023.

PIXEL DRIVING CIRCUIT AND DISPLAY DEVICE

CROSS REFERENCE TO RELATED APPLICATIONS

This application is a continuation-in-part of U.S. patent application Ser. No. 17/942,219, filed on Sep. 12, 2022, which is a continuation of U.S. application Ser. No. 17/890,737, filed Aug. 18, 2022, which is a continuation-in-part of U.S. application Ser. No. 17/547,393, filed Dec. 10, 2021, now U.S. Pat. No. 11,482,165, which is a continuation of U.S. application Ser. No. 17/047,544, filed Oct. 14, 2020, now U.S. Pat. No. 11,238,783, which is a national stage of International Application No. PCT/KR2018/009078, filed Aug. 9, 2018, claiming priority based on Korean Patent Application No. 10-2018-0074941 filed Jun. 28, 2018.

TECHNICAL FIELD

The present embodiments relate to a pixel driving circuit and a display device including the same.

RELATED ART

Display devices using light-emitting diodes (LED) are gaining popularity in a wide range of fields, from small handheld electronic devices to large outdoor display devices. LED display devices enable accurate voltage switching of each pixel by allowing each pixel to include a pixel circuit for driving a LED.

DETAILED DESCRIPTION OF THE DISCLOSURE

Technical Problem

An embodiment of the present disclosure is to provide a display device capable of reducing power consumption.

Technical Solution

A pixel driving circuit according to an embodiment of the present disclosure may be electrically connected to a luminous element and may comprise a first circuit configured to control light-emission and non-emission of the luminous element in response to a control signal applied to each of a plurality of subframes included in a frame, a second circuit configured to store bit values of multi-bit data in the frame and generate the control signal based on the stored bit values, and a clock signal such that each subframe included in the frame is controlled according to each bit value, and wherein each of the plurality of subframes includes a data-writing period and a light-emitting period, during the data-writing period of each subframe, the second circuit receives and stores a corresponding bit string from among a plurality of bit strings of n-bit data, wherein the plurality of bit strings are generated by a combination of bits in the number of n, which is smaller than m, from among m bits constituting a bit string of the multi-bit data, and the n-bit data is a bit string in which n bits from among the m bits are combined such that a difference in light-emitting periods of the plurality of subframes is minimized.

In addition, n may be (m/2)+1 or (m/2)−1 and two bit strings from among the bit strings of the n-bit data may include, as a common bit, at least one bit of the bit string of the m-bit data, and a time allocated to the common bit may be half a time allocated to the at least one bit in the bit string of the m-bit data.

In addition, n may be m/2, the bit strings of the n-bit data may not include bits at the same positions among the m bits, and sums of time allocated to each bit of the respective bit strings of the n-bit data may be approximate to one another.

In addition, the first circuit may include a first transistor configured to output a driving current and a second transistor configured to transmit or block the driving current to the luminous element according to the control signal.

In addition, the first pixel circuit may include a level shifter that converts a voltage level of the control signal.

In addition, the second pixel circuit may include a memory configured to store the bit values of the multi-bit data and a pulse width modulation (PWM) controller configured to read the bit values from the memory and determine a pulse width of the control signal for a subframe based on a length of the subframe and a bit value corresponding to the subframe.

A display device according to another embodiment of the present disclosure may comprise a pixel unit including a plurality of pixels, each including a luminous element and a pixel circuit connected to the luminous element, a current supply unit configured to supply a driving current to the plurality of pixels, and a clock generator configured to supply a clock signal to the plurality of pixels when each of a plurality of subframes constituting a frame starts, wherein the pixel circuit of each pixel includes a first circuit configured to control light-emission and non-emission of the luminous element in response to a control signal applied to each of a plurality of subframes included in a frame, a second circuit configured to store bit values of multi-bit data in the frame, and generate the control signal based on the stored bit values and a clock signal such that each subframe included in the frame is controlled according to each bit value, and wherein the each of the plurality of subframes includes a data-writing period and a light-emitting period, during the data-writing period of each subframe, the second circuit receives and stores a corresponding bit string from among a plurality of bit strings of n-bit data, wherein the plurality of bit strings are generated by a combination of bits in the number of n, which is smaller than m, from among m bits constituting a bit string of the multi-bit data, and the n-bit data is a bit string in which n bits from among the m bits are combined such that a difference in light-emitting periods of the plurality of subframes is minimized.

Advantageous Effects of the Disclosure

A display device according to an embodiment of the present disclosure can reduce power consumption.

BEST MODE FOR DISCLOSURE

Figure 1:
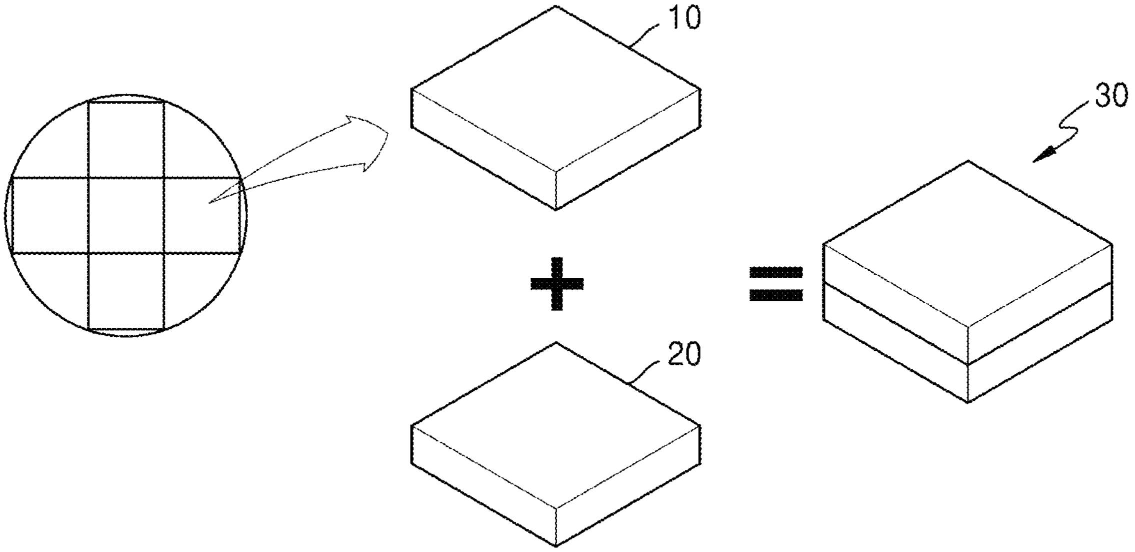
FIG. 1 is a diagram schematically illustrating a manufacturing process of a display device according to an embodiment of the present disclosure.

A pixel according to an embodiment of the present disclosure includes a luminous element and a pixel circuit connected to the luminous element, wherein the pixel circuit includes a first pixel circuit configured to control light-emission and non-emission of the luminous element in response to a control signal applied to each of a plurality of subframes constituting a frame during a light-emitting period and a second pixel circuit storing a bit value of image data in a data writing period and generating the control signal based on the bit value and a clock signal in the light-emitting period.

MODE for DISCLOSURE

Since the present disclosure may apply various transformations and have various embodiments, specific embodiments will be illustrated in a diagram and described in detail in the detailed description. The effects and features of the present disclosure, and a method of achieving them, will be clarified with reference to the embodiments described later in detail together with diagrams. However, the present disclosure is not limited to the embodiments disclosed below and may be implemented in various forms.

Hereinafter, embodiments of the present disclosure will be described in detail with reference to attached diagrams, and when describing with reference to diagrams, the same or corresponding constituent elements are assigned the same diagram symbol, and redundant descriptions thereof will be omitted.

In the following embodiments, terms such as first and second are used for distinguishing one constituent element from other constituent elements. These constituent elements should not be limited by these terms. In addition, in the following embodiments, expressions in the singular include plural expressions unless the context clearly indicates otherwise.

In the following embodiments, the connection between X and Y may include a case where X and Y are electrically connected, a case where X and Y are functionally connected, and a case where X and Y are directly connected. Here, X and Y may be objects (for example, devices, elements, circuits, wirings, electrodes, terminals, conductive films, layers, etc.). Therefore, it is not limited to a certain connection relationship, for example, a connection relationship indicated in a diagram or the detailed description, and may include other connection relationships than that indicated in a diagram or the detailed description.

The case where X and Y are electrically connected may include, for example, a case where at least one element that enables the electrical connection of X and Y (e.g., a switch, a transistor, a capacitor, an inductor, a resistance element, a diode, etc.) is connected between X and Y.

The case where X and Y are functionally connected may include a case where at least one circuit of a circuit that enables a functional connection of X and Y, like in a case where the signal output from X is transmitted to Y (e.g., a logic circuit (OR gate, inverter, etc.), a signal conversion circuit (an AD conversion circuit, a gamma correction circuit, etc.), a potential level conversion circuit (a level shifter circuit, etc.), a current supply circuit, an amplification circuit (a circuit that may increase signal amplitude or current amount, etc.), a signal generation circuit, and a memory circuit (a memory, etc.), is connected between X and Y.

In the following embodiments, "ON" used in connection with the element state may refer to an activated state of the element, and "OFF" may refer to an inactive state of the element. "on" used in connection with a signal received by the element may refer to a signal that activates the element, and "off" may refer to a signal that disables the element. The element may be activated by a high voltage or a low voltage. For example, the P-type transistor is activated by a low voltage, and the N-type transistor is activated by a high voltage. Therefore, it should be understood that the "on" voltage for the P-type transistor and the N-type transistor is the opposite (low vs. high) voltage level.

In the following embodiments, terms such as include or have means that the features or elements described in the specification are present, and do not preclude the possibility that one or more other features or elements may be added.

FIG. 1 is a diagram schematically illustrating a manufacturing process of a display device according to an embodiment of the present disclosure.

Referring to FIG. 1, the display device 30 according to an embodiment may include a luminous element array 10 and a driving circuit board 20. The luminous element array 10 may be coupled with the driving circuit board 20.

The luminous element array 10 may include a plurality of luminous elements. A luminous element may be a light-emitting diode (LED). At least one luminous element array 10 may be manufactured by growing a plurality of LEDs on a semiconductor wafer (SW). Accordingly, the display device 30 may be manufactured by coupling the luminous element array 10 with the driving circuit board 20, without the need to individually transfer the LED to the driving circuit board 20.

A pixel circuit corresponding to each LED on the luminous element array may be arranged on the driving circuit board 20. The LED on the luminous element array 10 and the pixel circuit on the driving circuit board 20 may be electrically connected to form a pixel PX.

Figure 2:
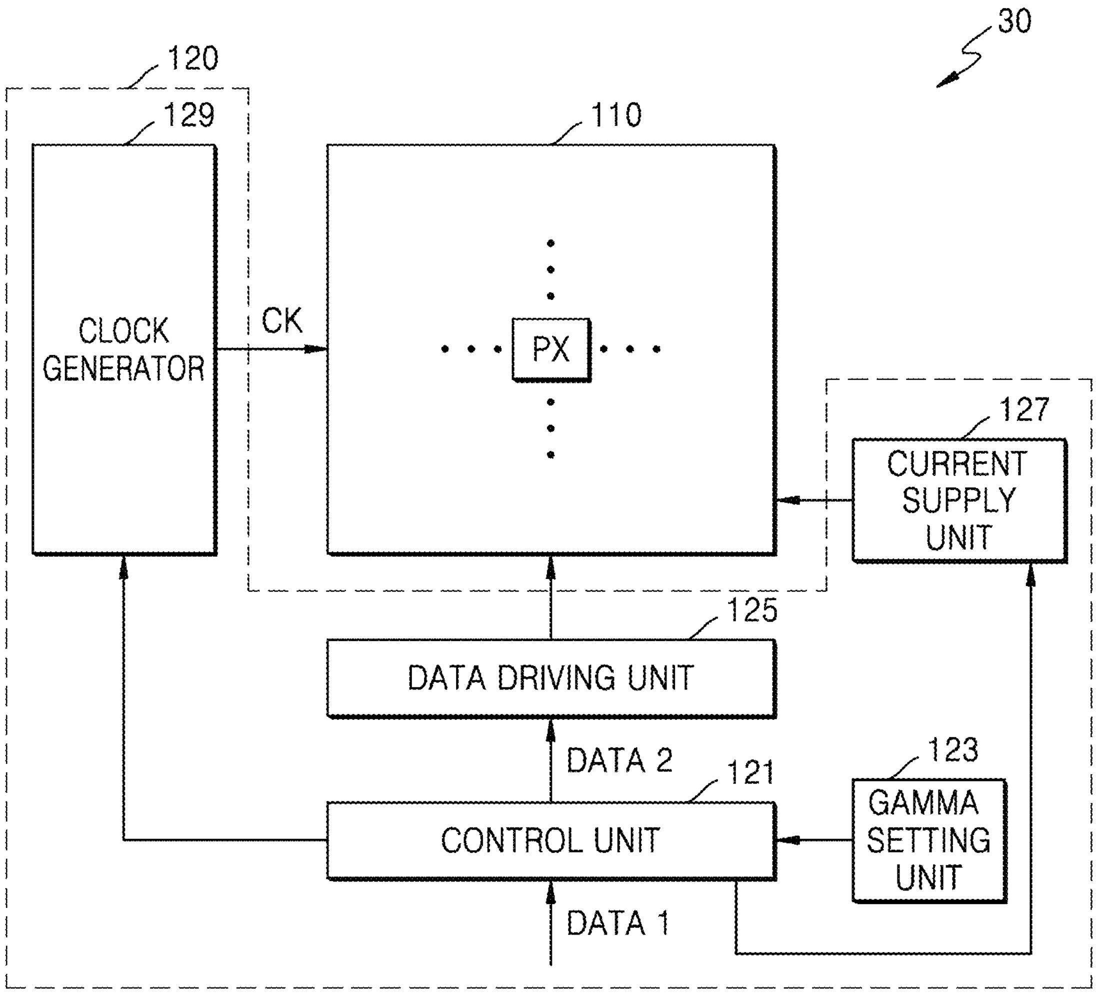
FIGS. 2 and 3 are diagrams schematically illustrating a display device according to an embodiment of the present disclosure.
Figure 3:
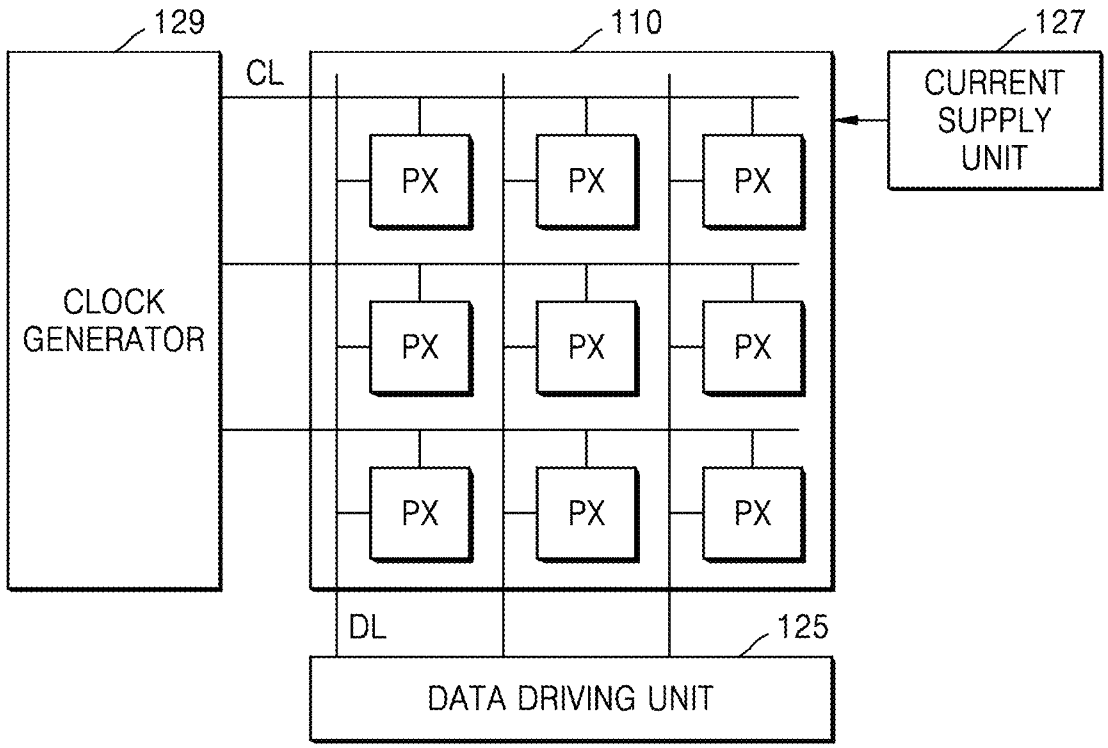

FIGS. 2 and 3 are diagrams schematically illustrating a display device 30 according to an embodiment of the present disclosure.

Referring to FIGS. 2 and 3, the display device 30 may include a pixel unit 110 and a driving unit 120.

The pixel unit 110 may display an image by using an n bit digital image signal capable of displaying 1 to $2^n$ gray scales. The pixel unit 110 may include a plurality of pixels PX arranged in a certain pattern, for example, a matrix-type pattern or a zigzag-type pattern. The pixel PX emits light of a single color, and may emit, for example, light of red, blue, green, or white. The pixel PX may emit light of other colors than red, blue, green, and white.

The pixel PX may include a luminous element. The luminous element may be a self-luminous element. For example, the luminous element may be a LED. The luminous element may be a LED having a micro to nano size. The luminous element may emit light having a single peak wavelength or may emit light having a plurality of peak wavelengths.

The pixel PX may further include a pixel circuit connected to the luminous element. The pixel circuit may include at least one thin-film transistor and at least one capacitor. The pixel circuit may be implemented by a semiconductor stack structure on a substrate.

A driving unit 120 may drive and control the pixel unit 110. The driving unit 120 may include a control unit 121, a gamma setting unit 123, a data driving unit 125, a current supply unit 127, and a clock generator 129.

The control unit 121 may receive image data of a frame from an external device (for example, a graphic controller) and extract gradations for each pixel PX, and convert the extracted gradations into digital data having a preset number of bits. The control unit 121 receives a correction value from the gamma setting unit 123 and performs gamma correction of input image data DATA1 using the correction value, thereby generating correction image data DATA2. The control unit 121 may output the correction image data DATA2 to the data driving unit 125. The control unit 121 may output, to a shift register 125, a most significant bit MSB to a least significant bit LSB of the correction image data DATA2 in a certain order.

The gamma setting unit 123 may set a gamma value using a gamma curve, set a correction value of image data according to a set gamma value, and output a set correction value to the control unit 121. The gamma setting unit 123 may be provided as a circuit separate from the control unit 121, or may be provided to be included in the control unit 121.

The data driving unit 125 may transfer, to each pixel PX of the pixel unit 110, the correction image data DATA2 from the control unit 121. The data driving unit 125 may provide a bit value included in the correction image data DATA2 to each pixel PX for every frame. The bit value may have one of a first logic level and a second logic level. The first logic level may be a high level and the second logic level may be a low level. Alternatively, the first logic level may be a low level and the second logic level may be a high level.

One frame may include a plurality of subframes. When display device 30 displays n bit image data, the frame may include 8 subframes. The lengths of subframes may be different from one another. For example, the length of a subframe corresponding to the most significant bit MSB of correction image data DATA2 may set to be the longest, and the length of a subframe corresponding to the least significant bit LSB may set to be the shortest. The order of the most significant bit MSB to the least significant bit LSB of the image data DATA2 may correspond to the order of a first subframe to an n-th subframe, respectively. The order of expression of subframes may be set differently depending on the designer.

The data driving unit 125 may include a line buffer and a shift register circuit. The line buffer may be one line buffer or two line buffers. The data driving unit 125 may provide n bit image data to each pixel in a line unit (a row unit).

The current supply unit 127 may generate and supply the driving current of each pixel PX. The configuration of the current supply unit 127 will be described later with reference to FIG. 4. The current supply unit 127 may be included in the pixel PX, specifically in the pixel circuit.

The clock generator 129 may generate a clock signal for every subframe during a single frame and output the generated clock signal to pixels PX. The length of the clock signal may be the same as the length of the corresponding subframe. The clock generator 129 may sequentially supply a clock signal to the clock line CL for every subframe. The clock generator 129 may generate a clock signal according to a preset subframe order. For example, when the order of expression of four subframes is 1-2-3-4, the clock generator 129 may sequentially output a first clock signal to a fourth clock signal in the order of the first subframe to a fourth subframe. When the output order of four subframes is 1-3-2-4, the clock generator 129 may output the clock signal in the order of the first clock signal, a third clock signal, a second clock signal, and the fourth clock signal in the order of the first subframe, the third subframe, the second subframe, and the fourth subframe.

Each component of the driving unit 120 may be formed as a separate integrated circuit chip or a single integrated circuit chip, and be mounted directly on a substrate on which the pixel unit 110 is formed, or be mounted on a flexible printed circuit film, or be attached in a form of a TCP (tape carrier package) on a substrate, or be formed directly on the substrate. In one embodiment, the control unit 121, the gamma setting unit 123, and the data driving unit 125 may be connected to the pixel unit 110 in the form of an integrated circuit chip, and the current supply unit 127 and the clock generator 129 may be formed directly on the substrate.

In one embodiment, the pixel unit 110 may include array of pixels and the array may form rows and columns. In the embodiment, a row controller may be connected to each of the rows and provide a clock signal to pixels in at least one of the rows in common. In the embodiment, a column controller connected to each of the columns and providing an image data signal to pixels in at least one of the columns in common.

In the embodiment, the control unit 121 may receive image data of a frame from an external device, generate a correction image data based on the received image data, and output the correction image data to the column controller. In the embodiment, the control unit 121 may output a most significant bit MSB to a least significant bit of the correction image data in a preset order to the column controller.

In one embodiment, the display device 30 may further include a parallel-to-serial converter.

The parallel to serial converter is configured to convert n clock signals generated by the clock generator 129 in parallel for each bit (e.g., MSB, LSB) into a serial clock signal. The parallel to serial converter may transfer the serial clock signal to the pixel unit 110.

The parallel to serial converter may be included in the same component as the second pixel circuit 50 of the pixel PX or may be included as a separate component among the driving circuits of the pixel PX. Also, the parallel to serial converter may be included in the clock generator 129.

Figure 4:
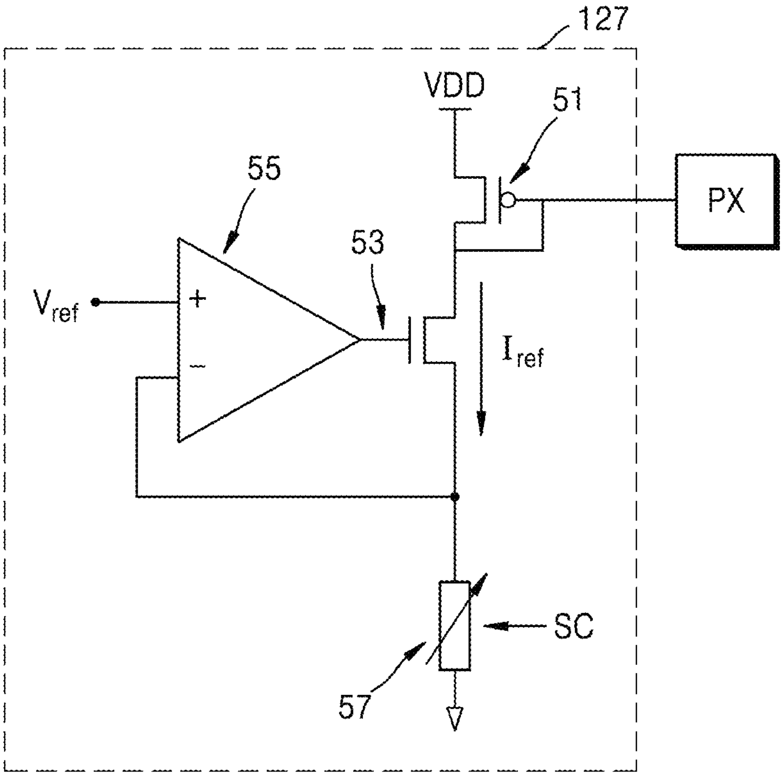
FIG. 4 is a circuit diagram illustrating a current supply unit according to an embodiment of the present disclosure.

FIG. 4 is a circuit diagram illustrating a current supply unit according to an embodiment of the present disclosure.

Referring to FIG. 4, the current supply unit 127 may include a first transistor 51, a second transistor 53, an operational amplifier 55, and a variable resistor 57.

The first transistor 51 has a gate connected to the pixel PX, a first terminal connected to a power voltage VDD, and a second terminal connected to the gate and a first terminal of the second transistor 53.

The second transistor 53 has a gate connected to an output terminal of the operational amplifier 55, the first terminal connected to the second terminal of the first transistor 51, and a second terminal connected to a second input terminal (−) of the operational amplifier 55.

A first input terminal (+) of the operational amplifier 55 is connected to a reference voltage Vref, and the second input terminal (−) is connected to the variable resistor 57. The output terminal of the operational amplifier 55 is connected to the gate of the second transistor 53. When the reference voltage Vref is applied to the first input terminal (+), the second transistor 53 may be turned on or off according to the voltage at the output terminal due to the voltage difference among the first input terminal (+), the second input terminal (−) and the output terminal.

A resistance value of the variable resistor 57 may be determined according to the control signal SC from the control unit 121. Depending on the resistance value of the variable resistor 57, a voltage of the output terminal of the operational amplifier 55 VDD may be changed, and the current $I_{ref}$ flowing along the first transistor 51 and second transistor 53 turned on from the power voltage VDD may be determined.

The current supply unit 127 may supply a driving current corresponding to the current $I_{ref}$ to the pixel PX by configuring a current mirror together with a transistor in the pixel PX. The driving current may determine a total luminance (brightness) of the pixel unit 110.

In the above-described embodiment, the current supply unit 127 includes the first transistor 51 implemented as a P-type transistor and the second transistor 53 implemented as an N-type transistor, but the embodiment of the present disclosure is not limited thereto. In one or more embodiments, the first transistor 51 and second transistor 53 may be implemented as different types of transistors, and an operational amplifier corresponding thereto may be configured to form the current supply unit 127.

Figure 5:
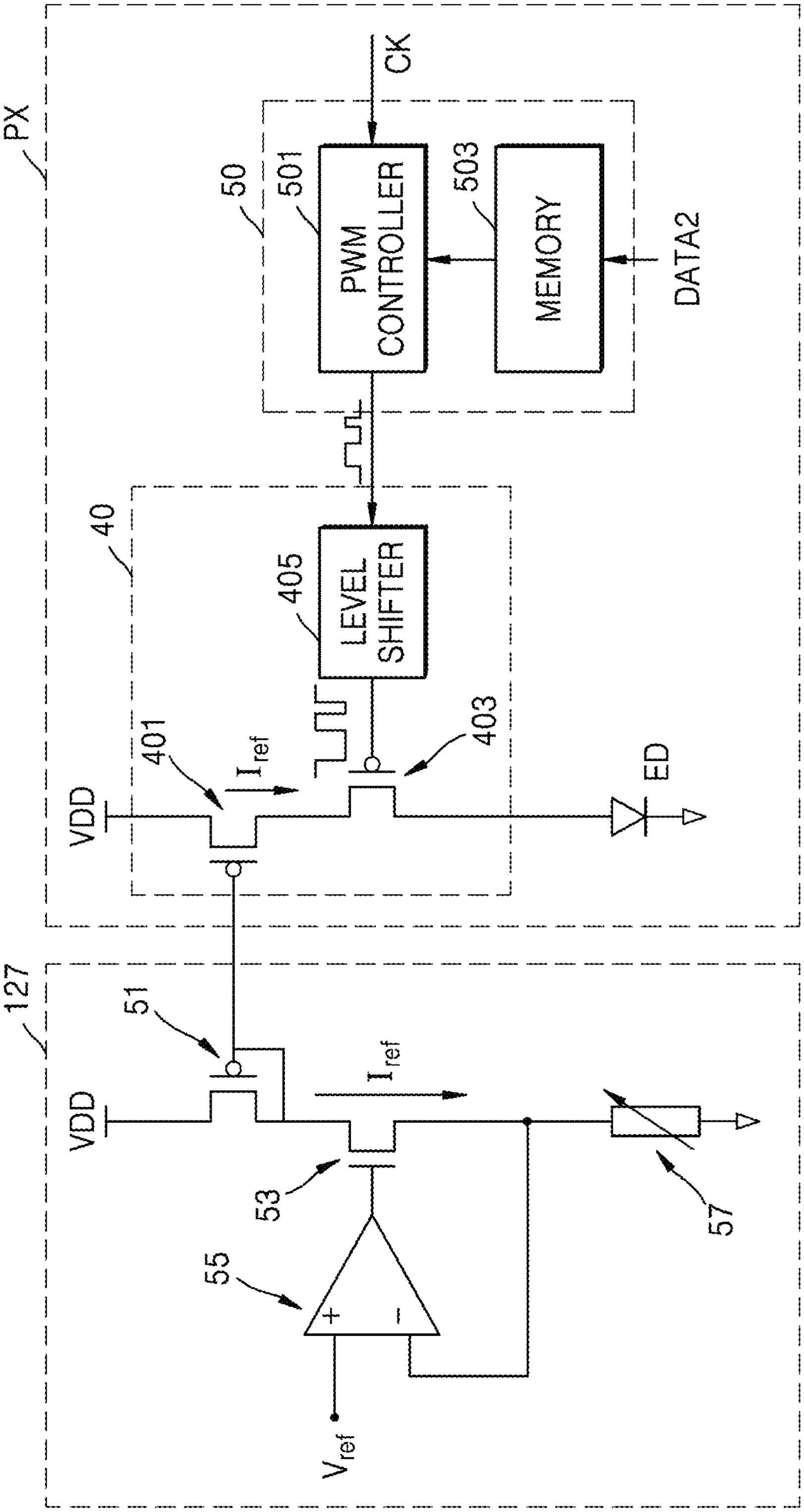
FIG. 5 is a circuit diagram illustrating a pixel PX according to an embodiment of the present disclosure.

FIG. 5 is a circuit diagram illustrating a pixel PX according to an embodiment of the present disclosure.

Referring to FIG. 5, the pixel PX may include a luminous element ED and a pixel circuit including a first pixel circuit 40 and a second pixel circuit 50 connected thereto. The first pixel circuit 40 may be a high voltage driving circuit, and the second pixel circuit 50 may be a low voltage driving circuit. The second pixel circuit 50 may be implemented as a plurality of logic circuits.

The luminous element ED may selectively emit light for every subframe based on a bit value (logic level) of image data provided from the data driving unit 125 during a single frame, thereby adjusting the light-emission time within the single frame to display gradation.

The first pixel circuit 40 may control light-emission and non-emission of the luminous element ED in response to the control signal applied to each of the plurality of subframes during a single frame. The control signal may be a pulse width modulation (PWM) signal. The first pixel circuit 40 may include a first transistor 401, a second transistor 403, and a level shifter 405 electrically connected to the current supply unit 127.

The first transistor 401 may output the driving current. The first transistor 401 includes a gate connected to the current supply unit 127, a first terminal connected to the power voltage VDD, and a second terminal connected to a first terminal of the second transistor 403. The gate of the first transistor 401 is connected to the gate of the first transistor 51 of the current supply unit 127, thereby forming a current mirror circuit with the current supply unit 127. Accordingly, as the first transistor 51 of the current supply unit 127 is turned on, the first transistor 401 which has been turn on may supply a driving current corresponding to the current $I_{ref}$ formed in the current supply unit 127. The driving current may be equal to the current $I_{ref}$ flowing in the current supply unit 127.

The second transistor 403 may transmit or block the driving current to the luminous element ED according to the PWM signal. The second transistor 403 includes a gate connected to an output terminal of the level shifter 405, the first terminal connected to the second terminal of the first transistor 401, and a second terminal connected to the luminous element ED.

The second transistor 403 may be turned on or off according to the voltage output from the level shifter 405. The light-emission time of the luminous element ED may be adjusted according to the turn-on or turn-off time of the second transistor 403. The second transistor 403 may be turned on when a gate-on-level signal (low level in the embodiment of FIG. 5) is applied to the gate, and transfers the driving current $I_{ref}$ output from the first transistor 401 to the luminous element ED, so that the luminous element ED may emit light. The second transistor 403 may be turned off when a gate-off level signal (high level in the embodiment of FIG. 5) is applied to the gate, and blocks the driving current $I_{ref}$ output from the first transistor 401 from being transferred to the luminous element ED, so that the luminous element ED may not emit light. During a single frame, the light-emission time and the non-emission time of the luminous element ED are controlled by the turn-on time and the turn-off time of the second transistor 403, so that a color depth of the pixel unit 110 may be expressed.

The level shifter 405 may be connected to an output terminal of a PWM controller 501 of the second pixel circuit 50, and may convert a voltage level of a first PWM signal output from the PWM controller 501 to generate a second PWM signal. The level shifter 405 may generate a second PWM signal by converting a first PWM signal into a gate-on voltage level signal capable of turning on the second transistor 403 and a gate-off level signal capable of turning off the second transistor 403.

A pulse voltage level of the second PWM signal output by the level shifter 405 may be higher than a pulse voltage level of the first PWM signal, and the level shifter 405 may include a booster circuit that boosts an input voltage. The level shifter 405 may be implemented as a plurality of transistors.

The turn-on time and turn-off time of the second transistor 403 during a single frame may be determined according to a pulse width of the first PWM signal.

The second pixel circuit 50 may store a bit value of image data applied from the data driving unit 125 during a data writing period for every frame, and generate the first PWM signal based on the bit value and a clock signal during the light-emitting period. The second pixel circuit 50 may include the PWM controller 501 and a memory 503.

The PWM controller 501 may generate the first PWM signal based on a clock signal CK input from the clock generator 120 and a bit value of image data read from the memory 503 during the light-emission period. When a clock signal in a subframe is input from a clock generator 120, the PWM controller 501 may read a corresponding image data bit value from the memory 503 to generate a first PWM signal.

The PWM controller 501 may control a pulse width of a first PWM signal based on a bit value of image data in a subframe and a signal width of a clock signal. For example, when the bit value of the image data is 1, the pulse output of the PWM signal may be turned on as much as the signal width of the clock signal, and when the bit value of the image data is 0, the pulse output of the PWM signal may be turned off as much as the signal width of the clock signal. That is, an on time of the pulse output of the PWM signal and an off time of the pulse output may be determined by the signal width (signal length) of the clock signal. The PWM controller 501 may include at least one logic circuit (for example, an OR gate circuit, etc.) implemented as at least one transistor.

In synchronization with a frame start signal, the memory 503 may receive and store in advance the n bit correction image data DATA2 applied through a data line DL from the data driving unit 125 during the data writing period. In the case of a still image, image data previously stored in the memory 503 before an image update or refresh may be used for continuous image display for a plurality of frames.

The bit values (logic levels) from the most significant bit MSB to the least significant bit LSB of the n bit correction image data DATA2 may be input from the data driving unit 125 to the memory 503 in a certain order. The memory 503 may store at least 1 bit data. In one embodiment, the memory 503 may be an n bit memory. In the memory 503, the bit values from the most significant bit MSB to the least significant bit LSB of correction image data DATA2 may be recorded during the data writing period of the frame. In another embodiment, the memory 503 may be implemented as a bit memory of less than n depending on a driving frequency. The memory 503 may be implemented as at least one transistor. The memory 503 may be implemented as a random access memory (RAM), for example, SRAM or DRAM.

Figure 6:
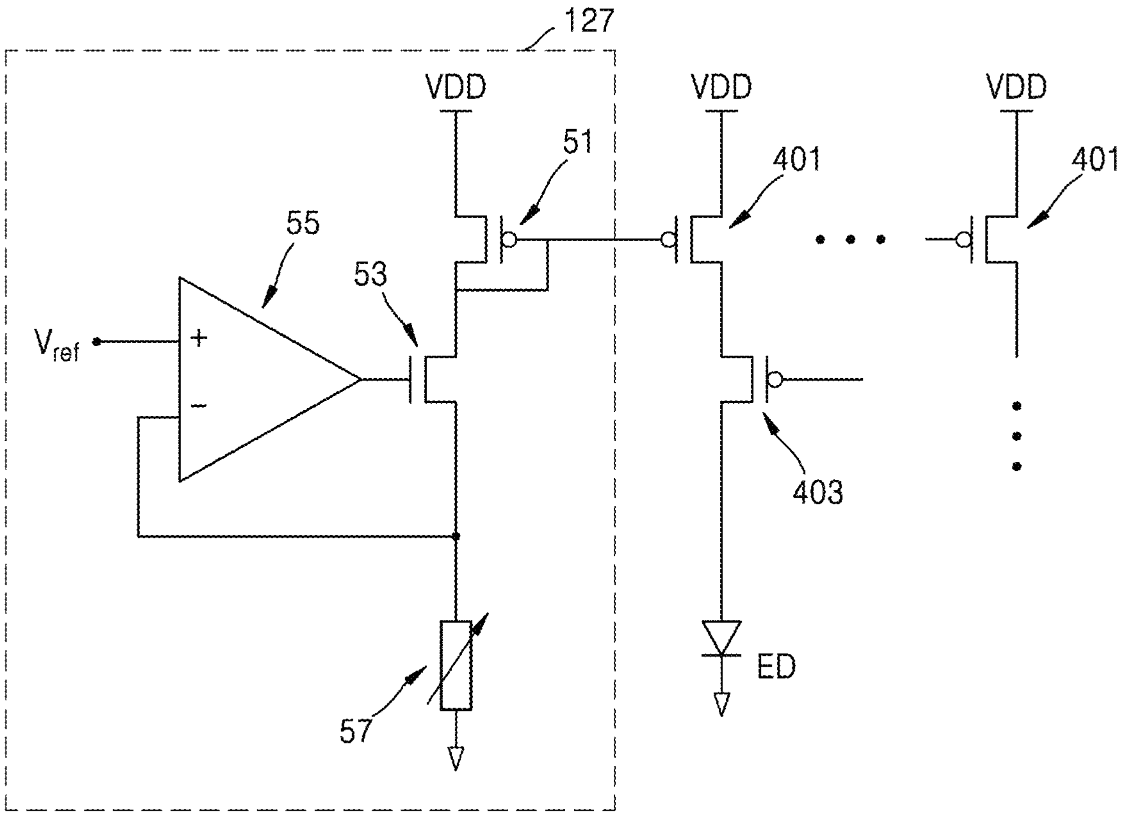
FIG. 6 is a diagram illustrating a connection relationship between a current supply unit and a pixel according to an embodiment of the present disclosure.

In the embodiment of FIG. 5, the current supply unit 127 is connected to one pixel PX, but the current supply unit 127 may be shared by a plurality of pixels PX. For example, as illustrated in FIG. 6, the first transistor 51 of the current supply unit 127 may be electrically connected to the first transistor 401 of each pixel PX of the pixel unit 110 to form a current mirror circuit. In another embodiment, the current supply unit 127 may be provided for every row, and the current supply unit 127 of each row may be shared by a plurality of pixels PXs in the same row.

In the above-described embodiment, the pixel includes P-type transistors, but the present disclosure embodiment is not limited thereto. In one or embodiments, the pixel may include N-type transistors, and in this case, the pixel may be driven by a signal in which the level of the signal applied to the P-type transistors is inverted.

Figure 7:
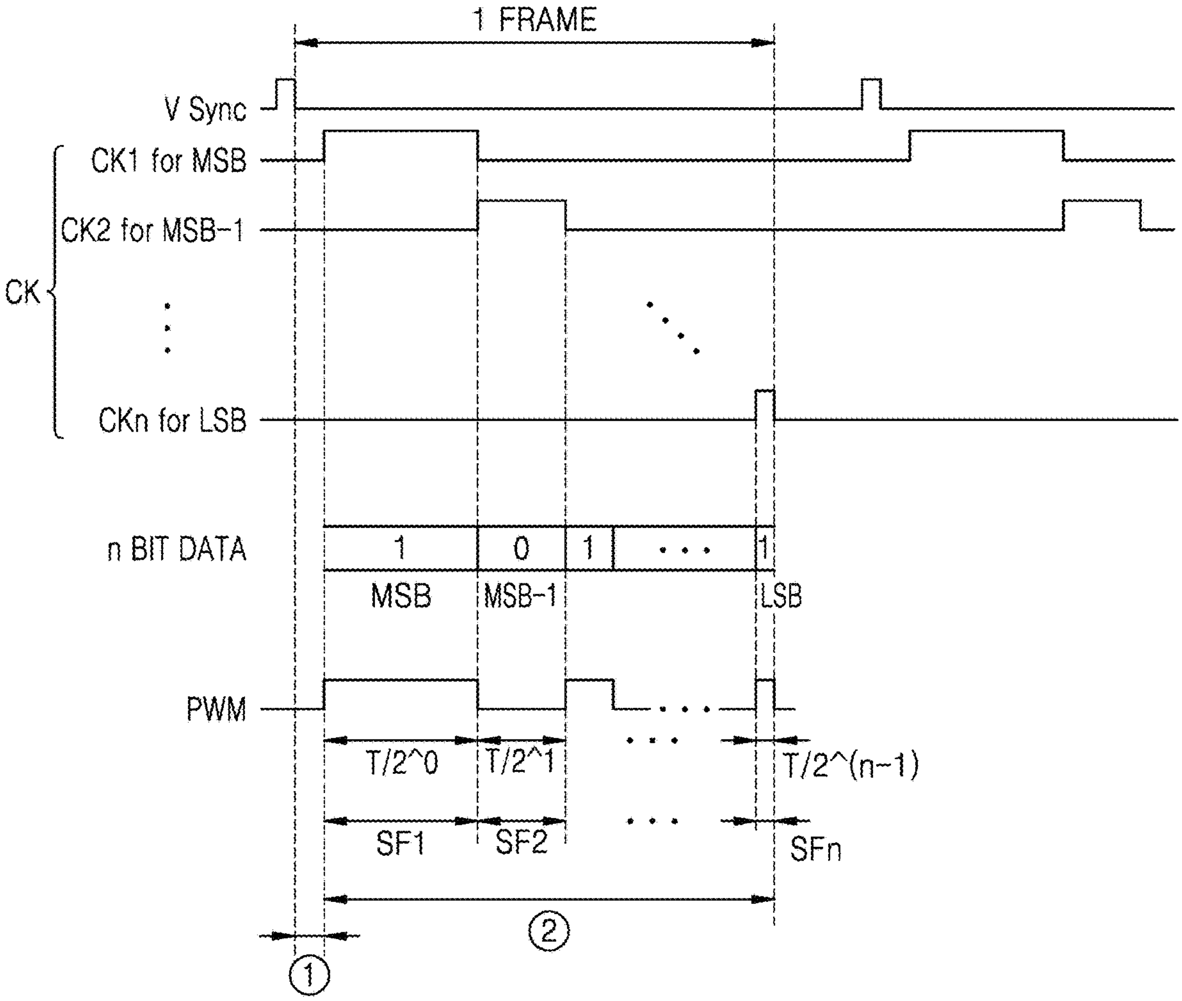
FIG. 7 is a diagram for describing driving of a pixel according to an embodiment of the present disclosure.

FIG. 7 is a diagram for explaining driving of a pixel according to an embodiment of the present disclosure.

FIG. 7 illustrates an example of driving a pixel in a first row. Referring to FIG. 7, the pixel PX may be driven in a data-writing period ① and a light-emitting period ② during a single frame. The light-emitting period ② may be driven by dividing into a first subframe SF1 to an n-th subframe SFn.

In the data-writing period ①, the bit value of the image data DATA from the data driving unit 125 may be recorded in the memory 503 in the pixel PX.

In each subframe of light-emitting period ②, a clock signal CK is applied to the PWM controller 501, and the PWM controller 501 may generate a PWM signal based on the bit value and clock signal CK of the image data DATA recorded in memory 503.

The lengths of time allocated to the first subframe SF1 to the n-th subframe SFn may be different from one another. For example, a first length $T/2^0$ may be allocated to the first subframe SF1, a second length $T/2^1$ may be allocated to a second subframe SF2, and a third length $T/2^2$ may be allocated to a third subframe SF3, and an n-th length $T/2^{(n-1)}$ may be allocated to the n-th subframe SFn.

The image data DATA may be represented by n bits including the most significant bit MSB and the least significant bit LSB. The order from the most significant bit MSB to the least significant bit LSB may correspond to the order from the first subframe SF1 to the n-th subframe SFn.

The clock signal CK includes a first clock signal CK1 to an n-th clock signal CKn, and the first clock signal CK1 to the n-th clock signal CKn may be sequentially output in order corresponding to the order of first subframe SF1 to n-th subframe SFn.

The length of clock signal CK may vary depending on a subframe. For example, the first clock signal CK1 corresponding to the first subframe SF1 allocated to the most significant bit MSB of the image data DATA may have the first length $T/2^0$, a second clock signal CK2 corresponding to the second subframe SF2 allocated to a next higher bit MSB-1 of the image data DATA may have the second length $T/2^1$, and the n-th clock signal CKn corresponding to an n-th subframe SFTn allocated to the least significant bit LSB of the image data DATA may have n-th length $T/2^{(n-1)}$.

For each of the first subframe SF1 to the n-th subframe SFn, the PWM controller 501 reads the corresponding bit value of the image data DATA from the memory 503, and may control the pulse width of the PWM signal based on the signal width of the clock signal CK and the bit value of the image data DATA.

The PWM controller 501 may generate the PWM signal (PWM) based on the clock signal CK output from the first subframe SF1 to the n-th subframe SFn and the bit value of the image data DATA.

In FIG. 7, an embodiment in which the image data DATA has n bit values of 101 . . . . 1 is illustrated. The PWM controller 501 may output a pulse having a pulse width of first length T based on a bit value 1 of MSB of the image data DATA and the first clock signal CK1. The PWM controller 501 may turn off the pulse output for a second length T/2 based on a bit value 0 of MSB-1 of the image data DATA and the second clock signal CK2. The PWM controller 501 may output a pulse having a pulse width of n-th length $T/2^{(n-1)}$ based on the bit value 1 of the LSB of the image data DATA and the n-th clock signal CKn.

The luminous element ED may emit light or may not emit light during a single frame according to the pulse output of the PWM signal. The luminous element ED may emit light for a time corresponding to the pulse width when the pulse output is turned on. The luminous element ED may not emit light as long as the pulse output is turned off.

Figure 8:
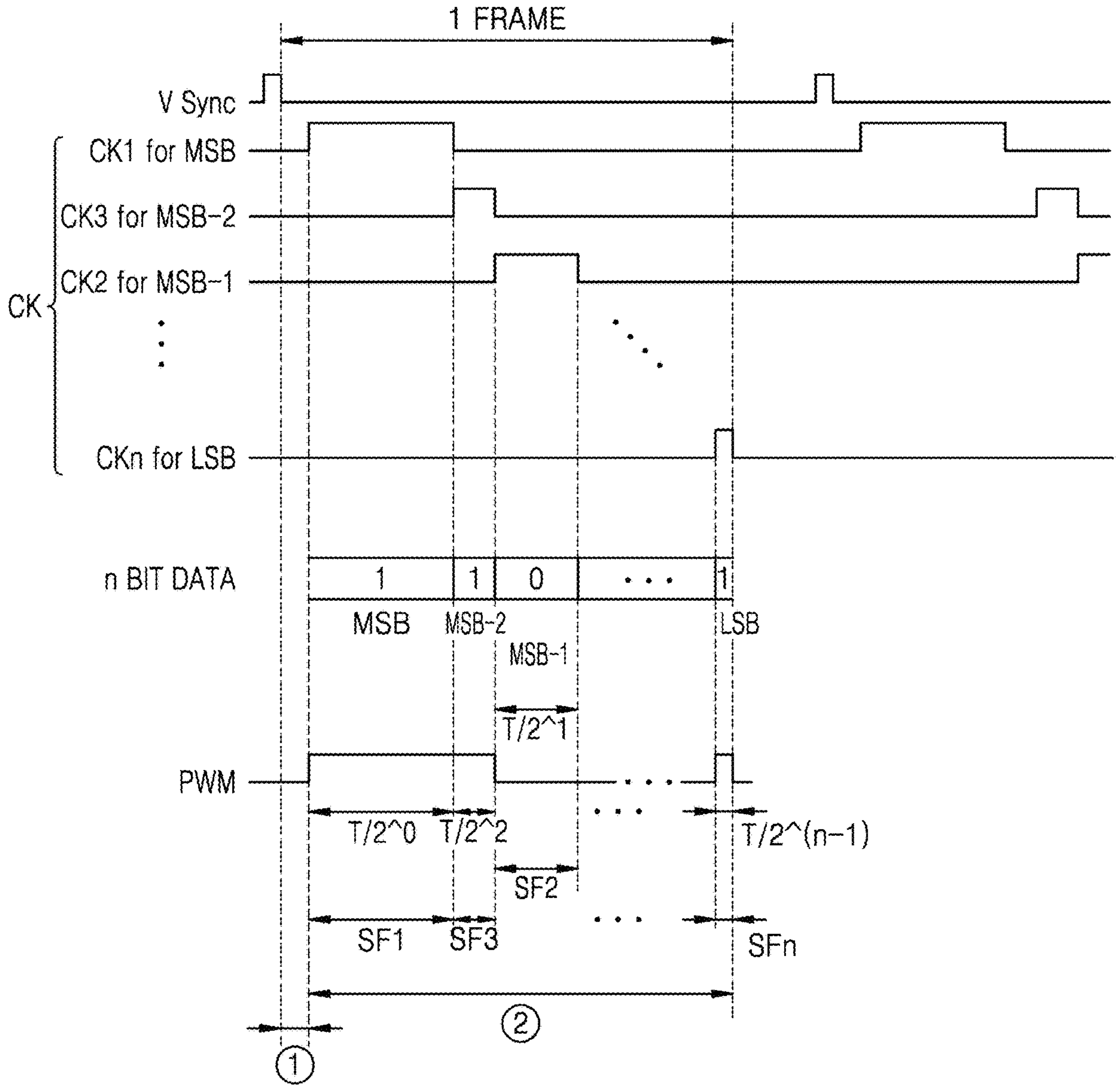
FIG. 8 is a diagram for explaining driving of a pixel according to another embodiment of the present disclosure.

FIG. 8 is a diagram for explaining driving of a pixel according to another embodiment of the present disclosure.

FIG. 8 is an example of driving a pixel in a first row. Referring to FIG. 8, the pixel PX may be driven in a data-writing period ① and a light-emitting period ② during a single frame. The light-emitting period ② may be driven by dividing into the first subframe SF1 to n-th subframe SFn. At this time, the order of expression of first subframe SF1 to n-th subframe SFn may be different from the embodiment of FIG. 7. FIG. 8 is an embodiment in which the third subframe SF3 is expressed earlier than the second subframe SF2. The clock signal CK and the bit order of image data DATA may also be determined corresponding to the expression order of the subframe. The order of expression of the subframe may be preset or changed.

Figure 9:
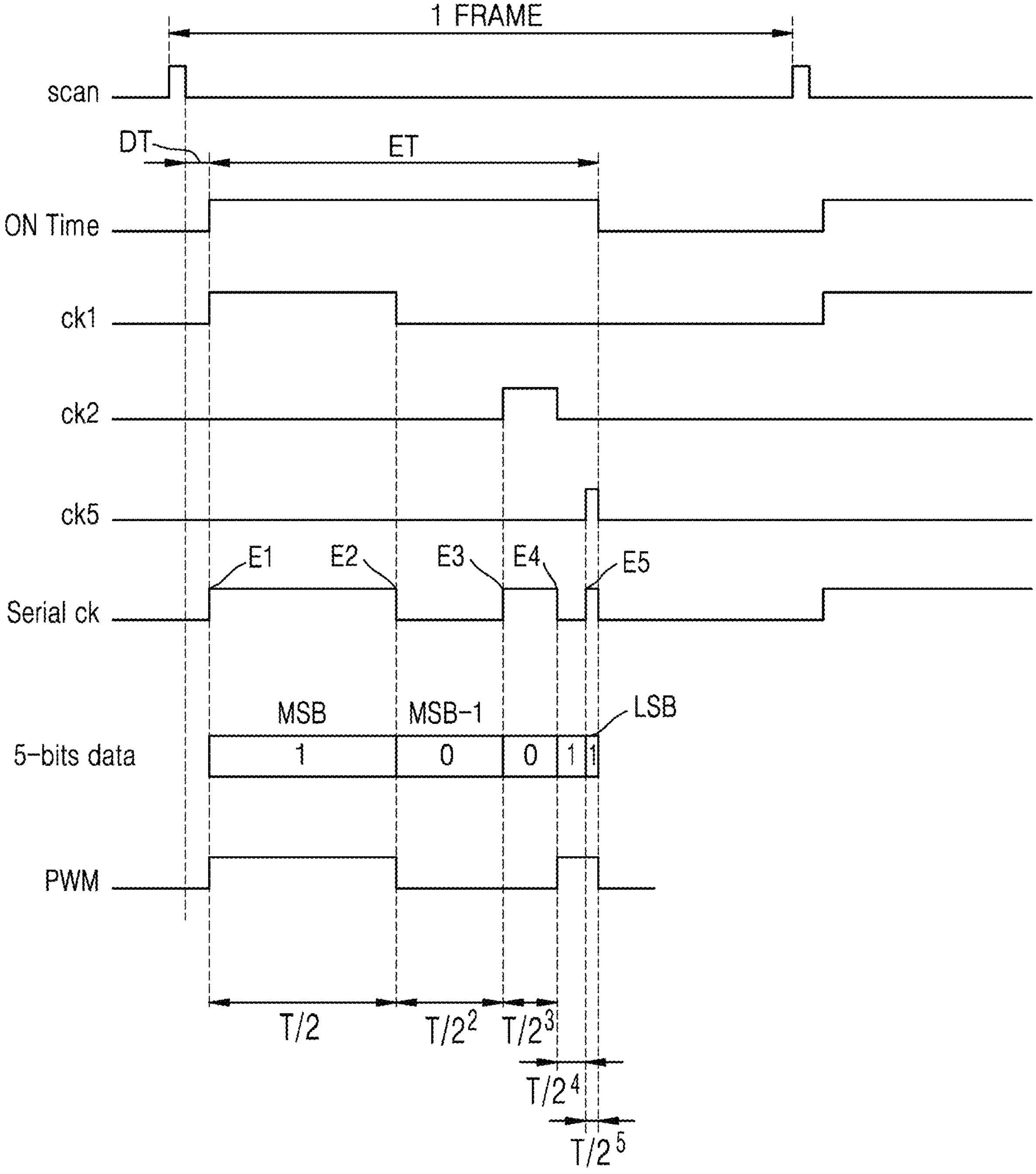
FIG. 9 is a diagram for explaining driving of a pixel with a serial clock signal according to an embodiment of the present disclosure.

FIG. 9 is a diagram for explaining driving of a pixel with a serial clock signal according to an embodiment of the present disclosure.

As mentioned above, the display device 30 according to an embodiment may convert n parallel clock signals into a serial clock signal through the parallel to serial converter.

The parallel to serial converter may be an element which is composed of a logic circuit including an OR gate. That is, when any one of a plurality of parallel clock signals input to the parallel to serial converter has high level, the parallel to serial converter may output a serial clock signal having a high level in a corresponding time period.

The serial clock signal may include information of edges (rising edges and/or falling edges) included in each of the plurality of parallel clock signals.

FIG. 9 shows an example in which a PWM signal is generated by 5-bit data (odd number) per frame.

Referring to FIG. 9, during the light emitting period of the single frame, a plurality of clock signals CK1, CK3, and CK5 may be generated by the clock generator 129 in synchronization with 5-bit data and may be converted into a serial clock signal Serial CK by the parallel to serial converter. The clock generator 129 according to an embodiment of the present disclosure may generate only clock signals corresponding to odd-numbered bits among bits included in the image data but is not limited thereto.

Each of the plurality of clock signals CK1, CK3, and CK5 may be applied at the same time as the time allocated to the most significant bit MSB, MSB-2, and LSB bits of 5-bit data.

The serial clock signal Serial CK may be applied to the PWM controller 501, and the PWM controller 501 may generate a PWM signal based on a bit value of 5-bit data written in the memory 503 and the serial clock signal Serial CK.

The PWM controller 501 may read the bit value of 5-bit data from the memory 503 and control the pulse width of the PWM signal based on the time interval between edges and the bit values of the bit data.

Specifically, the PWM controller 501 according to an embodiment of the present disclosure may distinguish bit values of 5-bit data based on the edge of the serial clock signal Serial CK. That is, reading a bit value (1) corresponding to the most significant bit MSB is performed based on the first edge E1, reading a bit value (0) corresponding to MSB-1 is performed based on the second edge E2, reading a bit value (0) corresponding to MSB-2 is performed based on the third edge E3, reading a bit value (1) corresponding to MSB-3 is performed based on the forth edge E4, and reading a bit value (1) corresponding to the least significant bit LSB is performed based on the fifth edge E5. In this case, the first edge E1, the third edge E3, and the fifth edge E5 may be rising edges, and the second edge E2 and the fourth edge E4 may be falling edges. According to the above-described embodiment, the PWM controller 501 may read the bit value of the odd-numbered bit of the bit data when a rising edge is input and read the bit value of the even-numbered bit of the bit data when a falling edge is input.

Figure 10:
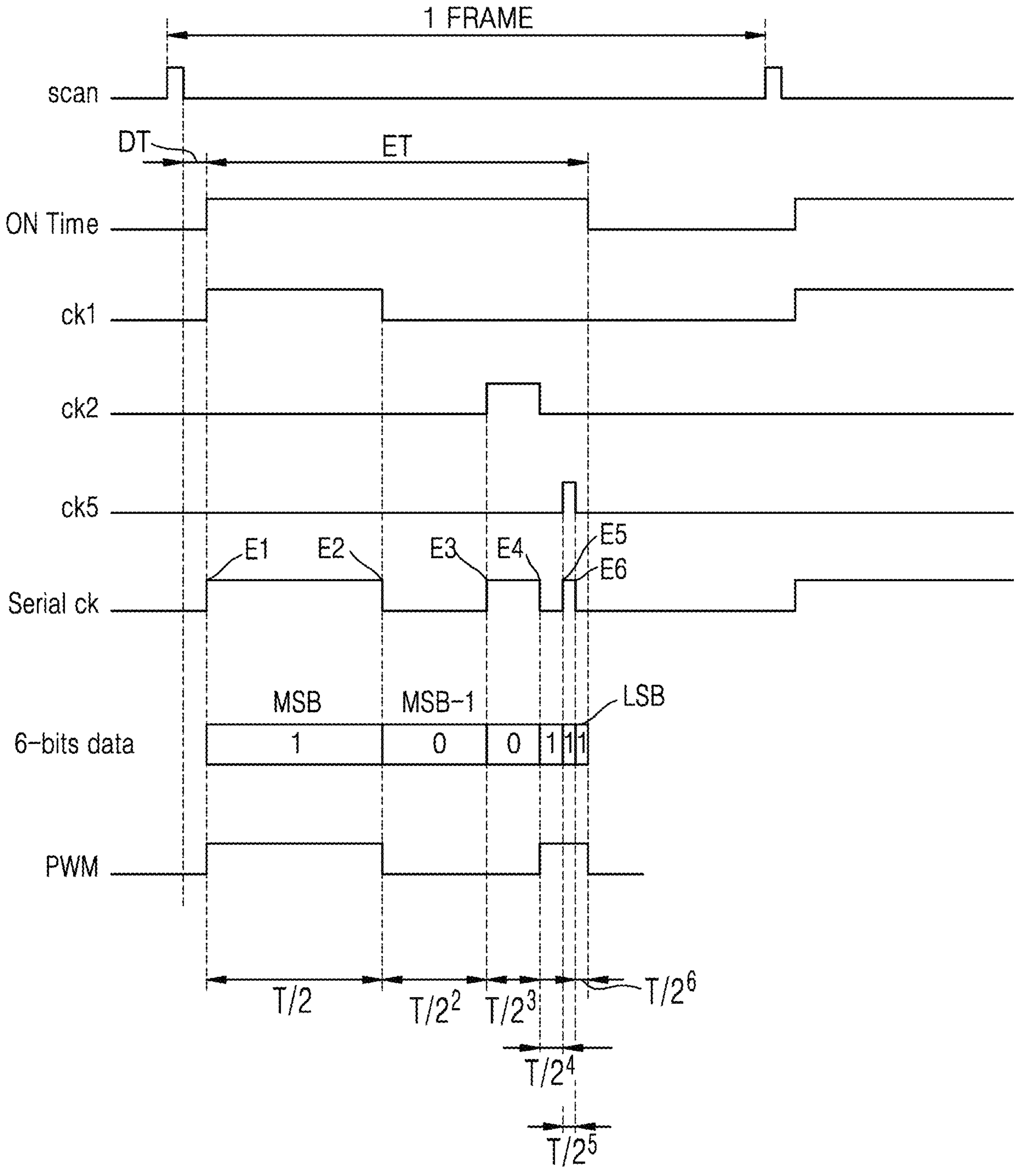
FIG. 10 is a diagram for explaining driving of a pixel with a serial clock signal according to another embodiment of the present disclosure.

FIG. 10 is a diagram for explaining driving of a pixel with a serial clock signal according to another embodiment of the present disclosure.

FIG. 10 shows an example in which a PWM signal is generated by 6-bit data (even number) per frame.

Referring to FIG. 10, similarly, during the light emission period of the single frame, a plurality of clock signals CK1, CK3, and CK5 may be generated by the clock generator 129 in synchronization with 6-bit data and may be converted into a serial clock signal Serial CK by the parallel to serial converter.

Each of the plurality of clock signals CK1, CK3, and CK5 may be applied at the same time as the time allocated to the most significant bit MSB, MSB-2, and MSB-4 bits of 6-bit data.

The serial clock signal Serial CK may be applied to the PWM controller 501, and the PWM controller 501 may generate a PWM signal based on a bit value of 6-bit data written in the memory 503 and the serial clock signal Serial CK.

The PWM controller 501 may read the bit value of 6-bit data from the memory 503 and control the pulse width of the PWM signal based on the time interval between edges and the bit values of the bit data.

Specifically, the PWM controller 501 according to an embodiment of the present disclosure may distinguish bit values of 6-bit data based on the edge of the serial clock signal Serial CK. That is, reading a bit value (1) corresponding to the most significant bit MSB is performed based on the first edge E1, reading a bit value (0) corresponding to MSB-1 is performed based on the second edge E2, reading a bit value (0) corresponding to MSB-2 is performed based on the third edge E3, reading a bit value (1) corresponding to MSB-3 is performed based on the forth edge E4, and reading a bit value (1) corresponding to LSB+1 is performed based on the fifth edge E5. In this case, the first edge E1, the third edge E3, and the fifth edge E5 may be rising edges, and the second edge E2 and the fourth edge E4 may be falling edges.

On the other hand, since the bit value corresponding to the least significant bit LSB is read based on the sixth edge E6, the PWM controller 501 generates a PWM signal through ON Time to which a predetermined time is added to the serial clock Serial CK. In this case, the predetermined time may be at least a time exceeding $T/2^6$, which is the time allocated to the LSB. FIG. 9 and FIG. 10 are provided as examples, and any suitable manner capable of generating a PWM signal based on a serial clock signal and controlling the pulse width of the PWM signal may be applied.

Figure 11:
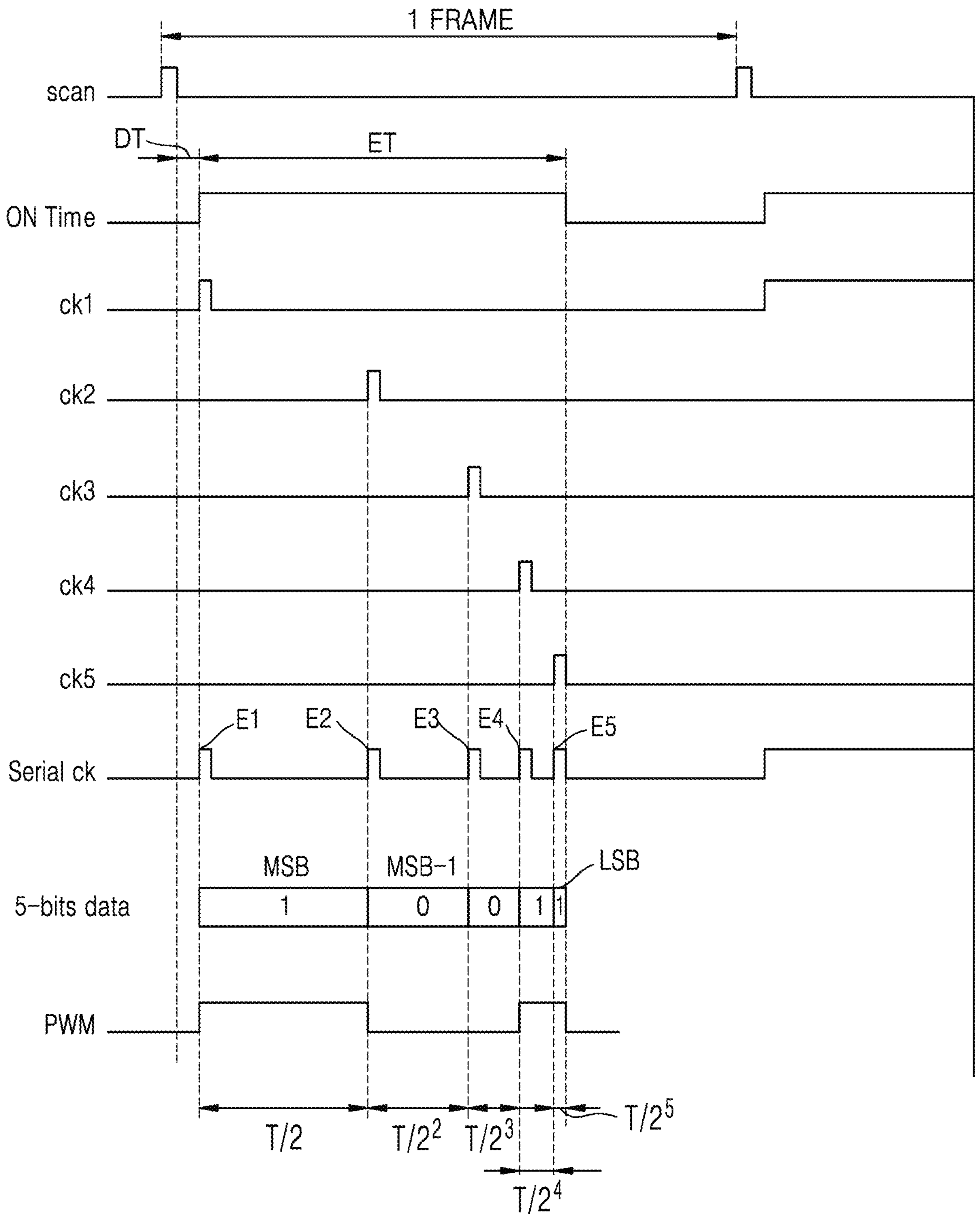
FIG. 11 is a diagram for explaining driving of a pixel with a serial clock according to another embodiment of the present disclosure.

FIG. 11 is a diagram for explaining driving of a pixel with a serial clock according to another embodiment of the present disclosure.

FIG. 11 may show an example in which a PWM controller set only rising edge as a reference for reading a bit value of bit data.

During the light emitting period of the single frame, a plurality of clock signals CK1 to CK5 may be generated by the clock generator 129 in synchronization with 5-bit data and may be converted into a serial clock signal Serial CK by the parallel to serial converter.

The PWM controller according to an embodiment of the present disclosure may read the bit value corresponding to the most significant bit MSB based on the first edge E1, the bit value corresponding to MSB-1 based on the second edge E2, the bit value corresponding to MSB-2 based on the third edge E3, the bit value corresponding to MSB-3 based on the forth edge E4, and the bit value corresponding LSB based on the fifth edge E5. At this time, all of the first edge E1 to the fifth edge E5 may be rising edges.

Meanwhile, in the present embodiment, since only the rising edge serves as a reference for reading a bit value, the signal width of the clock signal may be independent of PWM generation. Accordingly, the signal widths of the plurality of clock signals CK1 to CK5 may be freely generated unless they do not overlap between the clock signals.

For example, the clock signals CK1 to CK5 may be generated in the form of an impulse generating only a rising edge. Through this embodiment, power consumption generated on the clock line CL can be reduced.

Figure 12:
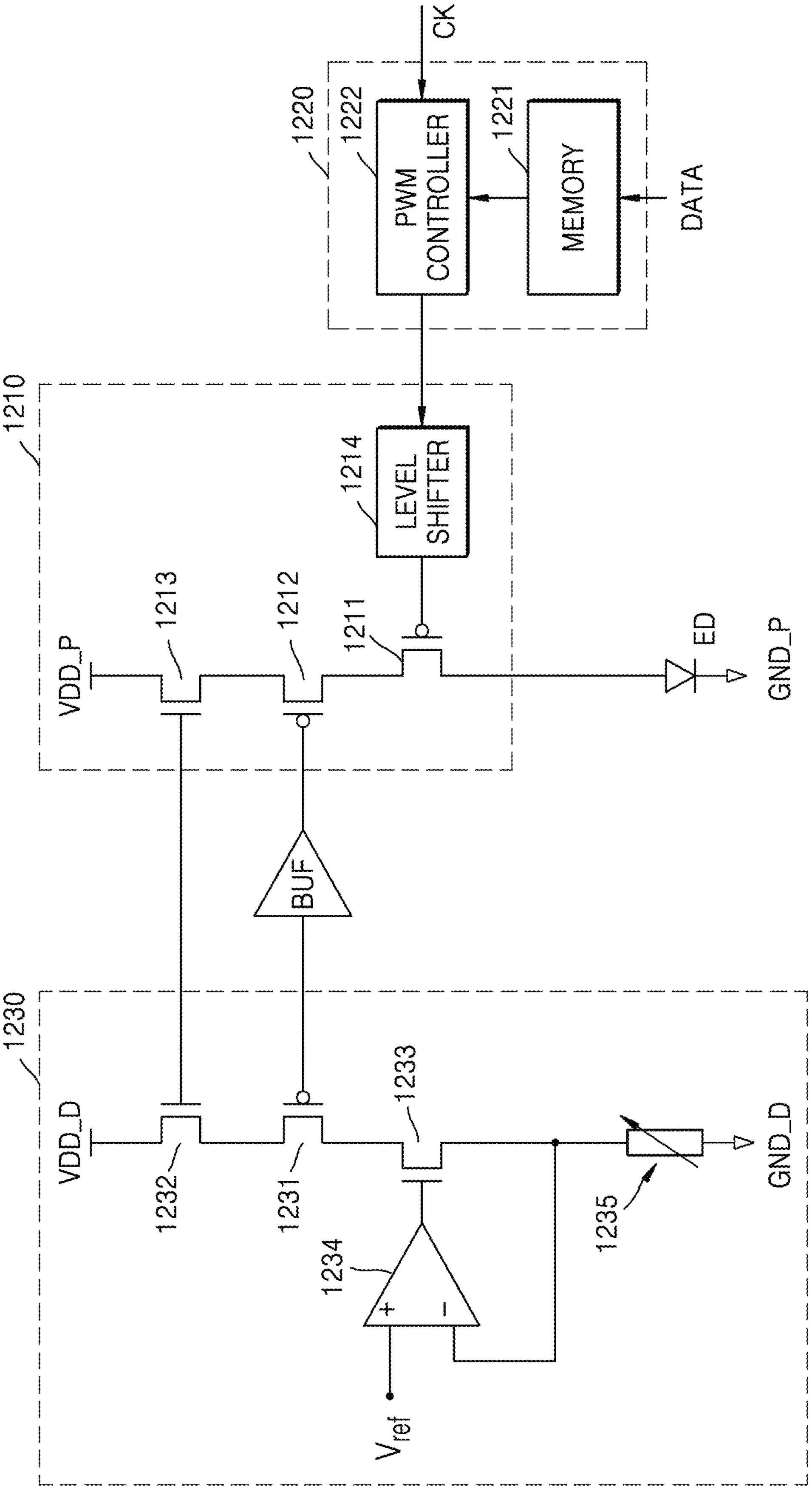
FIG. 12 is a circuit diagram illustrating a pixel PX driving apparatus according to an embodiment of the present disclosure.

FIG. 12 is a circuit diagram illustrating a pixel PX driving apparatus according to an embodiment of the present disclosure.

Referring to FIG. 12, the pixel PX driving apparatus may include a pixel circuit including a first pixel circuit 1210 connected to a luminous element ED (also referred as to an emitter) and a second pixel circuit 1220 and driving circuit 1230 connected to the pixel circuit. Although only one pixel circuit is illustrated in FIG. 12 for simplification of the drawing, a plurality of pixel circuits may be connected in parallel to a common power supply (e.g., driving circuit). The first pixel circuit 1210 may be a high voltage driving circuit and the second pixel circuit 1220 may be a low voltage driving circuit. The second pixel circuit 1220 may include a plurality of logic circuits.

The luminous element ED may selectively emit light for every subframe based on a bit value (logic level) of image data provided from the data driving unit 125 during a single frame, thereby adjusting the light-emission time within the single frame to display gradation.

The first pixel circuit 1210 may control light-emission and non-emission of the luminous element ED in response to the control signal applied to each of the plurality of subframes during a single frame. The control signal may be a pulse width modulation (PWM) signal.

The first pixel circuit 1210 may include a first transistor 1211, a second transistor 1212, a third transistor 1213, and a level shifter 1214. Hereinafter, an electrical connection connecting a pixel positive power VDD_P and a pixel negative power GND_P is referred to as a 'pixel line'.

The first transistor 1211 may be connected in series on the pixel line and may transmit or block a driving current to the luminous element ED in response to the control signal.

The first transistor 1211 may transmit or block the driving current to the luminous element ED in response to the PWM signal. A gate of the first transistor 1211 may be connected to an output terminal of the level shifter 1214, a first terminal of the first transistor 1211 may be connected to the second terminal of the second transistor 1212, and a second terminal of the first transistor 1211 may be connected to the luminous element ED.

The first transistor 1211 may be turned on or off according to the voltage output from the level shifter 1214. The light-emission time of the luminous element ED may be adjusted according to the turn-on or turn-off time of the first transistor 1211. The first transistor 1211 may be turned on when a gate-on-level signal is applied to the gate and transfers the driving current output from the second transistor 1212 to the luminous element ED, so that the luminous element ED may emit light. The first transistor 1211 may be turned off when a gate-off level signal is applied to the gate and blocks the driving current output from the second transistor 1212 to the luminous element ED, so that the luminous element ED may not emit light. During a single frame, the light-emission time and the non-emission time of the luminous element ED are controlled by the turn-on time and the turn-off time of the first transistor 1211, so that a color depth may be expressed.

The second transistor 1212 may output the driving current. A gate of the second transistor 1212 may be connected to the driving circuit 1230, the first terminal of the second transistor 1212 may be connected to the positive pixel power supply (VDD_P), and the second terminal of the second transistor 1212 may be connected to the first terminal of the first transistor 1211. The gate of the second transistor 1212 may be connected to a gate of a fourth transistor 1231, thereby forming a current mirror circuit together with the driving circuit 1230. Accordingly, as the fourth transistor of the driving circuit 1230 is turned on, the second transistor 1212 which has been turned on may supply a driving current corresponding to the current formed in the driving circuit 1230. The driving current may be equal to the current flowing in the driving circuit 1230.

The third transistor 1213 may be connected in series on the pixel line and may be connected to a source terminal of the second transistor 1212.

The level shifter 1214 may be connected to the second pixel circuit 1220. Specifically, the level shifter 1214 may be connected to an output terminal of the PWM controller 1222 of the second pixel circuit 1220. Since the detailed description of the level shifter 1214 has been described above with reference to FIG. 5, the detailed description thereof will not be provided again.

The second pixel circuit 1220 may store a bit value of image data applied from the data driving unit during a data writing period for every frame, and generate the PWM signal based on the bit value and a clock signal during the light-emitting period. The second pixel circuit 1220 may include a memory 1221 and the PWM controller.

Since detail descriptions of the memory 1221 and the PWM controller 1222 included in the second pixel circuit 1220 have been described above with reference to FIG. 5, the detail descriptions will be omitted.

The driving circuit 1230 may include the fourth transistor 1231, a fifth transistor 1232 and a current source, and the current source may include a sixth transistor 1233, an operational amplifier 1234 and a variable resistor 1235. Hereinafter, an electrical connection connecting between a driving positive power supply VDD_D and a driving negative power supply GND_D is referred to as a 'driving line'.

The current source may be connected in series on the driving line, applying a reference current. The reference current may be set to a current sufficient to cause the luminous element to emit light.

The fourth transistor 1231 may be configured to form a current mirror circuit with the second transistor 1212. The fourth transistor 1231 may be connected in series on the driving line and may be connected to the gate of the second transistor 1212.

The fifth transistor 1232 may be connected in series on the driving line, may be connected to a gate of the third transistor 1213, and may be connected to a source terminal of the fourth transistor 1231.

A drain terminal of the sixth transistor 1233 may be connected to a drain terminal of the fourth transistor 1231, a gate of the sixth transistor 1233 may be connected to an output terminal of the operational amplifier 1234, and a source terminal of the sixth transistor 1233 may be connected to a second input terminal (−) of the operational amplifier 1234.

A first input terminal (+) of the operational amplifier 1234 may be connected to a reference voltage Vref and the second input terminal (−) may be connected to the variable resistor 1235.

As illustrated in FIG. 12, the second transistor and the fourth transistor may be implemented as P-type MOSFETs, and the third transistor and the fifth transistor may be implemented as N-type MOSFETs. The gate of the fourth transistor and the drain terminal of the fourth transistor may be short-circuited.

The pixel PX driving apparatus according to the embodiment may further include buffer gate BUF connected between the gate of the second transistor and the fourth transistor.

In the pixel PX driving apparatus according to the embodiment, even when a voltage drop (IR drop) occurs due to a common impedance phenomenon due to the parallel connection of a plurality of pixels, the Vgs of the second transistor is not affected, thus the influence on the output current flowing in the pixel line can be minimized.

Hereinafter, with reference to FIGS. 13 to 21, embodiments of a display device in which data division is performed will be described in detail.

Figure 13:
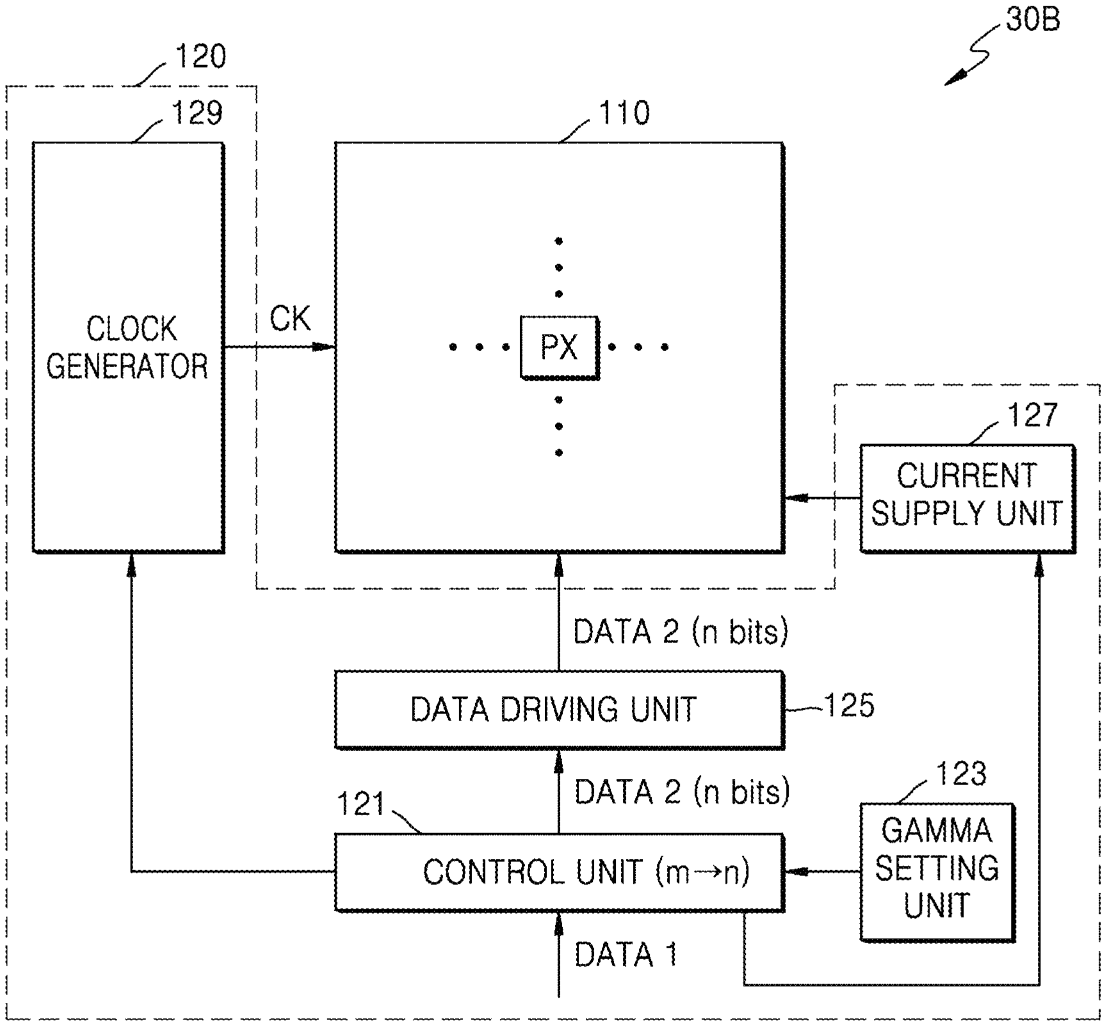
FIG. 13 is a diagram schematically illustrating a display device according to another embodiment of the present disclosure.
Figure 14:
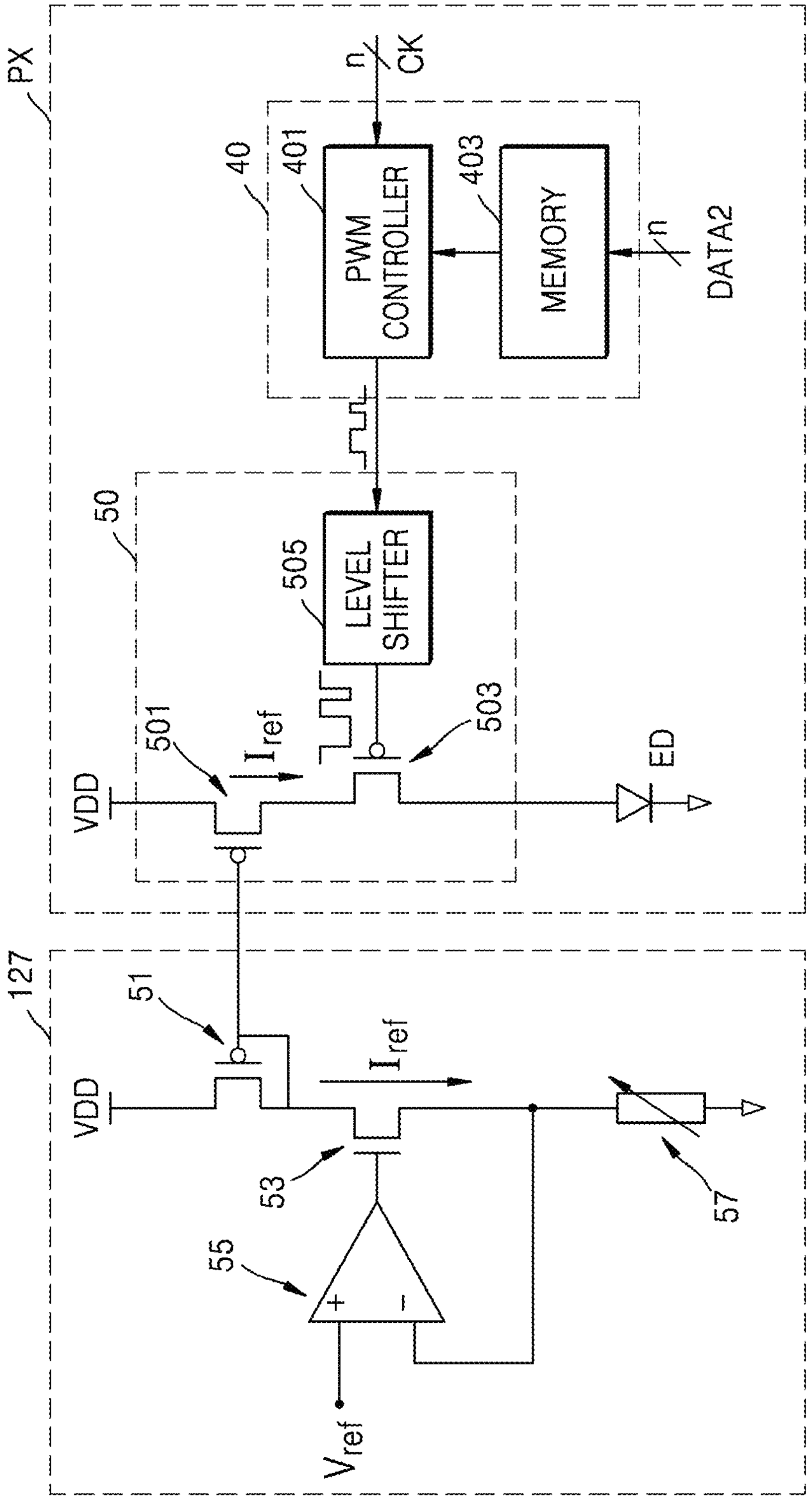
FIG. 14 is a circuit diagram illustrating a pixel PX of the display device of FIG. 13.
Figure 15:
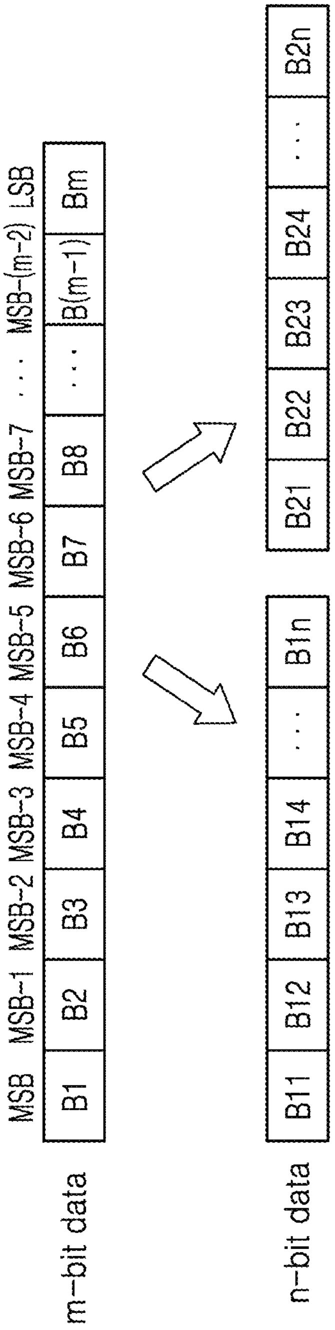
FIG. 15 is a diagram for describing data division by the display device of FIG. 13.

FIG. 13 is a diagram schematically illustrating a display device according to another embodiment of the present disclosure. FIG. 14 is a circuit diagram illustrating a pixel PX of the display device of FIG. 13. FIG. 15 is a diagram for describing data division by the display device of FIG. 13. Hereinafter, the above embodiment will be described by referring to FIGS. 13 through 15 together, and detailed description of the components provided above with reference to FIGS. 1 through 6 will be omitted.

A display device 30B may include a pixel unit 110 and a driving unit 120.

The pixel unit 110 may display an image by using an m-bit digital image signal capable of displaying 1 to $2^m$ gray scales. The pixel unit 110 may include a plurality of pixels PX arranged in a certain pattern, for example, a matrix-type pattern or a zigzag-type pattern. The pixel PX emits light of a single color, and may emit, for example, light of red, blue, green, or white. The pixel PX may emit light of other colors than red, blue, green, and white.

The pixel PX may include a luminous element. The luminous element may be a self-luminous element. For example, the luminous element may be an inorganic LED. A luminous element may be a micro-LED. The luminous element may emit light having a single peak wavelength or may emit light having a plurality of peak wavelengths.

The pixel PX may further include a pixel circuit connected to the luminous element. The pixel circuit may include at least one thin-film transistor and at least one capacitor. The transistor may be a CMOS transistor.

The pixel PX may operate in a frame unit. A single frame may include a plurality of subframes. Each subframe may include a data-writing period and a light-emitting period. During a data-writing period, digital data of certain bits may be applied to the pixel PX and stored therein. Digital data of certain bits stored during a light-emitting period may be synchronized with a clock signal to be read, and the digital data may be converted into a PWM signal, so that the pixel PX may express gradation. A period of a subframe, specifically, a light-emitting period of a subframe, may be a sum of times respectively allocated to bits of digital data.

The driving unit 120 may drive and control the pixel unit 110. The driving unit 120 may include a control unit 121, a gamma setting unit 123, a data driving unit 125, a current supply unit 127, and a clock generator 129.

The control unit 121 may receive input image data DATA1 of one frame from the outside (for example, a graphic controller), and receive a correction value from the gamma setting unit 123 to perform gamma correction on the input image data DATA1 by using the correction value, thereby generating correction image data DATA2.

The control unit 121 may extract gradation of each pixel PX from the correction image data DATA2 of one frame and convert the extracted gradation into digital data of a certain preset number of bits (for example, m bits).

The control unit 121 may divide the m-bit data into p pieces of n-bit data, where n is less than m. Here, p may be the number of subframes. p may be a number smaller than n. The control unit 121 may generate a plurality of bit strings of n-bit data by combining bits in the number of n, which is smaller than m, from among m bits that form a bit string of the m-bit data. The control unit 121 may generate p pieces of n-bit data by combining bits of the m-bit data such that a difference in periods of subframes is minimized. For example, when a frame includes two subframes, the control unit 121 may generate two bit strings of n-bit data from a bit string of m-bit data such that a difference in periods of the two subframes is minimized.

FIG. 15 illustrates an example in which m-bit data, which is a bit string including m bit values from MSB (B1) to LSB (Bm), into two pieces of n-bit data. n-bit data on the left is a bit string including n bit values from MSB (B11) to LSB (B1n). n-bit data on the right is a bit string including n bit values from MSB (B21) to LSB (B2n). In an embodiment, n may be (m/2)+1 or (m/2)−1. Two bit strings from among bit strings of n-bit data may include, as a common bit, at least one particular bit of the bit string of m-bit data. A time allocated to the common bit may be half a time allocated to that particular bit in the bit string of the m-bit data. For example, when p is 2, the control unit 121 may divide 10-bit data into two pieces of 6-bit data or three pieces of 4-bit data. Two pieces of 6-bit data may include, as a common bit, at least one of the most significant bit MSB and the next higher bit MSB-1 of the 10 bits. A time allocated to the common bit of the two 6-bit data may be half a time allocated to the most significant bit MSB and/or the next higher bit MSB-1 of the 10 bits. Two pieces of 4-bit data from among three pieces of 4-bit data may include, as a common bit, at least one of a most significant bit MSB and a second next higher bit MSB-2. A time allocated to the common bit of the two pieces of 6-bit data may be half a time allocated to the most significant bit MSB and/or a next higher bit MSB-1 of the 10 bits.

In another embodiment, n may be m/2. Bit strings of n-bit data may not include bits at same positions from among m bits, and sums of times allocated to bits of each of the bit strings of the n-bit data may be approximate to one another.

For example, when p is 2, the control unit 121 may divide 10-bit data into two pieces of 5-bit data. Each bit of the two pieces of 5-bit data does not overlap each other.

The control unit 121 may distribute p pieces of n-bit data to p subframes and output the same to the data driving unit 125. A time (length) of a subframe may be equal to a sum of times respectively allocated to bits of n-bit data. A time allocated to each bit of the n-bit data may be a time allocated to a corresponding position in a bit string of m-bit data or half that time. Times of the subframes may be the same or different. The control unit 121 may generate a plurality pieces of n-bit data by combining bits of the m-bit data such that a time difference between the subframes (particularly, a difference in light-emitting period of the subframes) is minimized. The control unit 121 may generate a plurality pieces of n-bit data by dividing a time allocated to at least one of the most significant bit MSB, the next higher bit MSB-1, and the second next higher bit MSB-2, to which the longest time is allocated in the m-bit data.

Division and distribution of bit strings will be described in detail later.

The gamma setting unit 123 may set a gamma value using a gamma curve, set a correction value of image data according to a set gamma value, and output a set correction value to the control unit 121. The gamma setting unit 123 may be provided as a circuit separate from the control unit 121, or may be provided to be included in the control unit 121.

The data driving unit 125 may receive m-bit data from the control unit 121 in a subframe unit and transmit the same to each pixel PX of the pixel unit 110.

The data driving unit 125 may include a line buffer and a shift register circuit. The line buffer may be one line buffer or two line buffers. The data driving unit 125 may provide n-bit data to each pixel for every subframe in a line unit (a row unit).

The current supply unit 127 may generate and supply a driving current of each pixel PX. The structure of the current supply unit 127 is described with reference to FIGS. 4 through 6, and thus detailed description thereof will be omitted here.

The clock generator 129 may generate n clock signals for every subframe during a single frame and output the generated clock signals to pixels PX. n clock signals may be output to correspond to each bit of m-bit data. A signal width (length or ON time) of a clock signal may be determined according to a time allocated to each bit of m-bit data. The clock generator 129 may sequentially supply n clock signals to the clock line CL for every subframe.

The pixel PX may include a luminous element ED and a pixel circuit including a first pixel circuit 40 and a second pixel circuit 50 connected thereto. The structure of the pixel PX is described above with reference to FIG. 5, and thus detailed description thereof will be omitted.

The luminous element ED may selectively emit light or not emit light for every subframe during a single frame, based on a bit value (logic level) of image data provided from the data driving unit 125, thereby adjusting the light-emission time within the single frame to display gradation.

The second pixel circuit 50 may store bit values of n-bit data applied from the data driving unit 125 during a data-writing period for every subframe, and generate a first PWM signal based on n bit values and n clock signals during the light-emitting period. The second pixel circuit 50 may include the PWM controller 501 and the memory 503.

The PWM controller 501 may generate the first PWM signal based on a clock signal CK input from the clock generator 129 and a bit value of corresponding image data read from the memory 503 during the light-emitting period. A signal width of a clock signal may be equal to a time allocated to a bit position of a corresponding bit. The PWM controller 501 may control a pulse width of the first PWM signal based on a bit value of corresponding image data in a subframe unit and a signal width of a clock signal. In synchronization with a subframe start signal, the memory 503 may receive and store in advance the n-bit data applied through a data line DL from the data driving unit 125 during the data-writing period for every subframe.

Bit values (logic level) of n-bit data may be input from the data driving unit 125 to the memory 503 in a certain order. The memory 503 may store at least 1 bit data. In one embodiment, the memory 503 may be a memory of less than m bits. For example, the memory 503 may be an n-bit memory. n bit values of n-bit data may be recorded to the memory 503 during a data-writing period of a subframe. The memory 503 may be implemented as at least one transistor. The memory 503 may be implemented as a random access memory (RAM), for example, SRAM or DRAM.

When m-bit data is applied to the memory 503 without conversion, the memory 503 needs to have a capacity sufficient to store the m-bit data, and this may be a restriction factor in minimizing a pixel. When the memory 503 has 1-bit capacity, pixels are to be driven based on a plurality of subframes (for example, m subframes), and this increases driving frequency, and the increased driving frequency in turn increases current consumption, which in the case of battery-operated products may be a restriction factor. In addition, different times need to be allocated to each subframe. However, according to the embodiments of the present disclosure, memory capacity may be reduced by using an n-bit memory of less than m bits, as the memory 503, thereby reducing a pixel size. In addition, by using an n-bit memory, the number of subframes may be reduced compared to 1-bit memory, thereby maintaining an appropriate driving frequency.

The first pixel circuit 40 may control light-emission and non-emission of the luminous element ED in response to a control signal applied from the second pixel circuit 50 in each of a plurality of subframes during a single frame. The control signal may be a PWM signal. The first pixel circuit 40 may include a first transistor 401, a second transistor 403, and a level shifter 405 electrically connected to the current supply unit 127.

Figure 16:
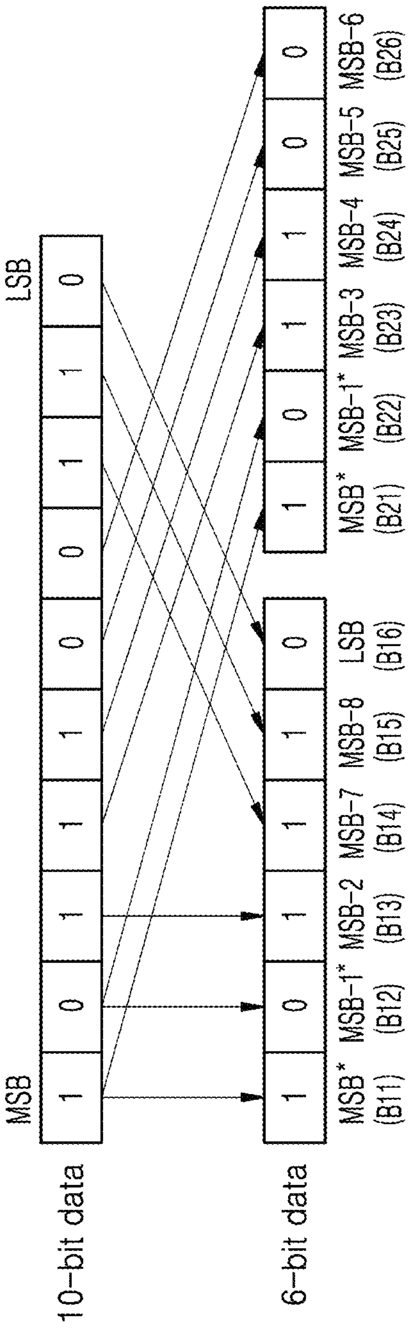
FIG. 16 is a diagram for describing bit data division according to an embodiment of the present disclosure.
Figure 17:
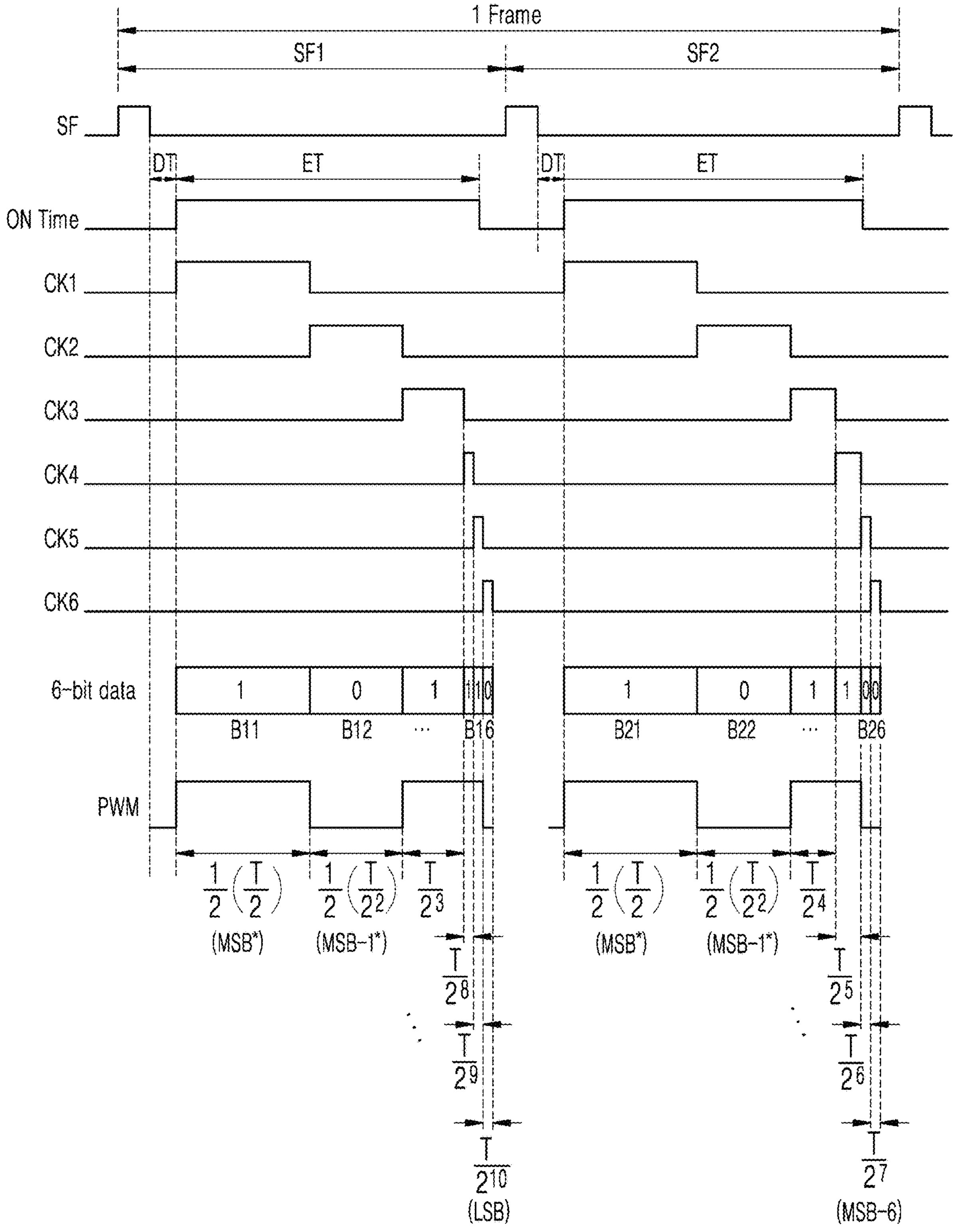
FIG. 17 is a diagram for describing driving timing of a clock signal according to an embodiment of the present disclosure.

FIG. 16 is a diagram for describing bit data division according to an embodiment of the present disclosure. FIG. 17 is a diagram for describing driving timing of a clock signal according to an embodiment of the present disclosure. FIG. 17 illustrates an example of driving timing of a clock signal applied to an arbitrary row.

In FIGS. 16 and 17, an example is illustrated, in which one frame includes two subframes and a PWM signal is generated by two pieces of 6-bit data generated by dividing 10-bit data in each subframe.

Referring to FIG. 16, in a bit string (1011100110) of 10-bit data of a pixel PX, 1, which is the leftmost bit (B1), is the MSB, and 0, which is the rightmost bit (B10), is the LSB. 10-bit data may be divided into two bit strings of 6-bit data. Bits may be combined such that a difference between a time of a first subframe SF1 and a time of a second subframe SF2, specifically, a difference between a light-emitting period ET of the first subframe SF1 and a light-emitting period ET of the second subframe SF2 is minimized.

First 6-bit data (B11 through B16) is a combination (101110) of MSB(B1)*/MSB-1(B2)*/MSB-2(B3)/MSB-7

(B8)/MSB-8(B9)/LSB(B10) of the 10-bit data (B1 through B10). Second 6-bit data (B21 through B26) is a combination (101100) of MSB(B1)*/MSB-1(B2)*/MSB-3(B4)/MSB-4 (B5)/MSB-5(B6)/MSB-6(B7) of the 10-bit data (B1 through B10). Here, "**" denotes that half (½) of a time allocated to a corresponding bit in the 10-bit data is allocated to the bit marked with '*'. That is, 1, which is the leftmost bit (B11, B21) of the first 6-bit data and the second 6-bit data, is 1 that is the most significant bit MSB (B1) of the 10-bit data, and is the common bit taken from the same position of the 10-bit data, and half of the time allocated to the MSB of the 10-bit data is allocated to each thereof. Likewise, 0, which is the second left bit (B12, B22) of the first 6-bit data and the second 6-bit data, is 0 that is the next higher bit MSB-1 (B2) of the 10-bit data, and is the common bit taken from the same position of the 10-bit data, and half of the time allocated to the MSB-1 is allocated to each thereof.

The first 6-bit data (left) is image data of the first subframe SF1, and the second 6-bit data (right) is image data of the second subframe SF2. Referring to FIG. 17, the pixel PX may be driven in a data-writing period DT and a light-emitting period ET for every subframe of a single frame. An ON time of the light-emitting period ET makes up most of a time of a subframe, and thus, the term 'a time of a subframe' and the term 'a light-emitting period' may be interchangeable herein. A time of a first subframe and a time of a second subframe may be different but approximate. Hereinafter, 'approximate' may mean that the time of the first subframe and the time of the second subframe are equal or a difference therebetween is about 10% to about 20%.

In the data-writing period DT of the first subframe SF1, bit values of n-bit data from the data driving unit 125 may be recorded (stored) in the memory 503 in the pixel PX. That is, the bit string (101110) of the first 6-bit data (B11 through B16) of FIG. 16 may be recorded in the memory 503 in the pixel PX.

In the light-emitting period ET of the first subframe SF1, first through sixth clock signals CK1 through CK6 may be applied to the PWM controller 501 in synchronization with 6-bit data, and the PWM controller 501 may generate a PWM signal based on bit values of the 6-bit data recorded in the memory 503 and the first through sixth clock signals CK1 through CK6.

The first through sixth clock signals CK1 through CK6 of the first subframe SF1 may be each applied for a same time as a time allocated to each bit of the 6-bit data. For example, the first clock signal CK1 may be applied for ½×(T/2), half the time (T/2) allocated to the MSB. The second clock signal CK2 may be applied for ½×($T/2^2$), half the time ($T/2^2$) allocated to the MSB-1. The third clock signal CK3 may be applied for ($T/2^3$), the time allocated to the MSB-2. The fourth clock signal CK4 may be applied for ($T/2^8$), the time allocated to the MSB-7. The fifth clock signal CK5 may be applied for ($T/2^9$), the time allocated to the MSB-8. The sixth clock signal CK6 may be applied for ($T/2^{10}$), the time allocated to the LSB.

In the data-writing period DT of the second subframe SF2, the bit value of the n-bit data from the data driving unit 125 may be recorded in the memory 503 in the pixel PX. That is, the bit string (101100) of the second 6-bit data (B21 through B26) of FIG. 16 may be recorded in the memory 503 in the pixel PX.

In the light-emitting period ET of the second subframe SF2, the first through sixth clock signals CK1 through CK6 may be applied to the PWM controller 501 in synchronization with the 6-bit data, and the PWM controller 501 may generate a PWM signal based on the bit value of the 6-bit data recorded in the memory 503 and the first through sixth clock signals CK1 through CK6.

The first through sixth clock signals CK1 through CK6 of the second subframe SF2 may be each applied for a same time as a time allocated to each bit of the 6-bit data. For example, the first clock signal CK1 may be applied for ½×(T/2), half the time (T/2) allocated to the MSB. The second clock signal CK2 may be applied for ½×($T/2^2$), half the time ($T/2^2$) allocated to the MSB-1. The third clock signal CK3 may be applied for ($T/2^4$), the time allocated to the MSB-3.

The fourth clock signal CK4 may be applied for ($T/2^5$), the time allocated to the MSB-4. The fifth clock signal CK5 may be applied for ($T/2^6$), the time allocated to the MSB-5. The sixth clock signal CK6 may be applied for ($T/2^7$), the time allocated to the MSB-6.

The PWM controller 501 may generate the PWM signal (PWM) based on the clock signal CK output from the first subframe SF1 and the second subframe SF2 and the bit value of the bit data. In each of the first subframe SF1 and the second subframe SF2, the PWM controller 501 may control a pulse width of a PWM signal based on the bit value of the 6-bit data read from the memory 503 and a signal width of a corresponding clock signal CK.

Figure 18:
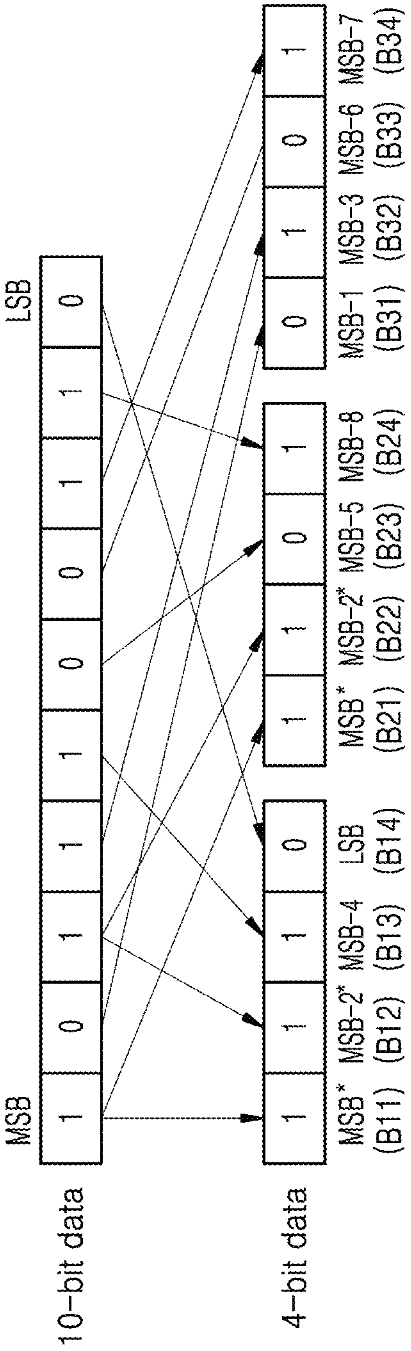
FIG. 18 is a diagram for describing bit data division according to another embodiment of the present disclosure.
Figure 19:
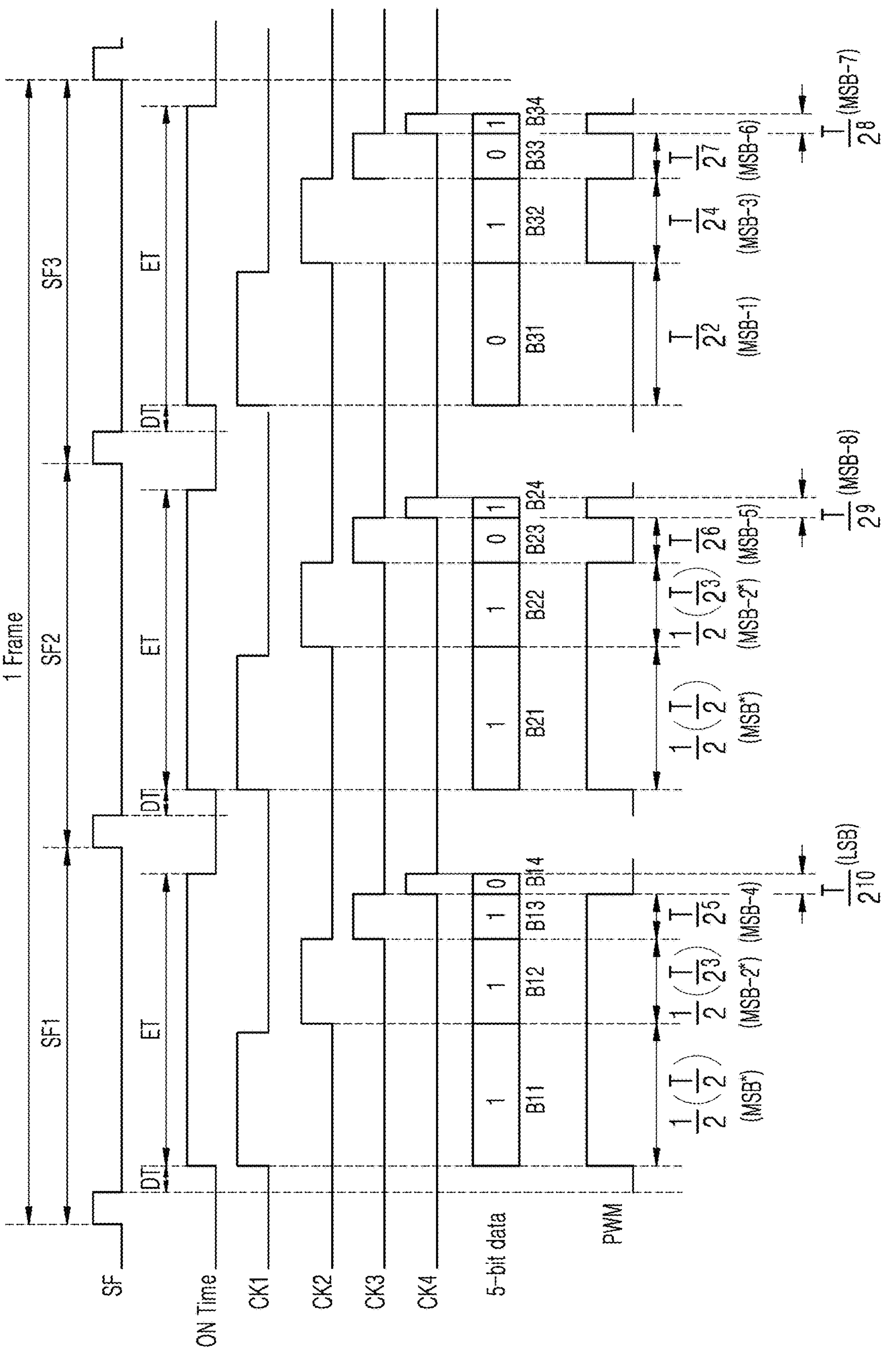
FIG. 19 is a diagram for describing driving timing of a clock signal according to another embodiment of the present disclosure.

FIG. 18 is a diagram for describing bit data division according to another embodiment of the present disclosure. FIG. 19 is a diagram for describing driving timing of a clock signal according to another embodiment of the present disclosure. FIG. 19 illustrates an example of driving timing of a clock signal applied to an arbitrary row.

In FIGS. 18 and 19, an example is illustrated, in which one frame includes three subframes and, in each subframe, a PWM signal is generated by three pieces of 4-bit data generated by dividing 10-bit data.

Referring to FIG. 18, in a bit string (1011100110) of 10-bit data (B1 through B10) of a pixel PX, 1, which is the leftmost bit (B1) is the MSB, and 0, which is the rightmost bit (B10), is the LSB. 10-bit data may be divided into three bit strings of 4-bit data. Bit data may be combined such that a difference in times of first through third subframes SF1 through SF3, specifically, a difference in light-emitting periods ET of the first through third subframes SF1 through SF3 is minimized.

First 4-bit data (B11 through B14) is a combination (1110) of MSB(B1)*/MSB-2(B3)*/MSB-4(B5)/LSB(B10) of 10-bit data. Second 4-bit data (B21 through B24) is a combination (1101) of MSB(B1)*/MSB-2(B3)*/MSB-5 (B6)/MSB-8(B9) of 10-bit data. Third 4-bit data (B31 through B34) is a combination (0101) of MSB-1(B2)/MSB-3(B4)/MSB-6(B7)/MSB-7(B8) of 10-bit data. Here, "*" denotes that half (½) of a time allocated to a corresponding bit in the 10-bit data is allocated to the bit marked with '*'. That is, 1, which is the leftmost bit (B11, B21) of the first 4-bit data and the second 4-bit data, is 1 that is the most significant bit MSB (B1) of the 10-bit data, and is the common bit taken from the same position of the 10-bit data, and half of the time allocated to the MSB of the 10-bit data is allocated to each thereof. Likewise, 1, which is the second left bit (B12, B22) of the first 4-bit data and the second 4-bit data, is 1 that is the third bit MSB-2 (B3) of the 10-bit data, and is the common bit taken from the same position of the 10-bit data, and half of the time allocated to the MSB-2 is allocated to each thereof.

The first 4-bit data (left) is image data of the first subframe SF1, and the second 4-bit data (middle) is image data of the second subframe SF2, and the third 4-bit data (right) is image data of the third subframe SF3.

Referring to FIG. 19, the pixel PX may be driven in a data-writing period DT and a light-emitting period ET for every subframe of a single frame. A time of a first subframe and a time of a second subframe may be different but approximate.

In the data-writing period DT of the first subframe SF1, bit values of n-bit data from the data driving unit 125 may be recorded in the memory 503 in the pixel PX. That is, the bit string (1110) of the first 4-bit data (B11 through B14) of FIG. 18 may be recorded in the memory 503 in the pixel PX.

In the light-emitting period ET of the first subframe SF1, first through fourth clock signals CK1 through CK4 may be applied to the PWM controller 501 in synchronization with the 4-bit data, and the PWM controller 501 may generate a PWM signal based on bit values of the 4-bit data recorded in the memory 503 and the first through fourth clock signals CK1 through CK4.

The first through fourth clock signals CK1 through CK4 of the first subframe SF1 may be each applied for a same time as a time allocated to each bit of the 4-bit data. For example, the first clock signal CK1 may be applied for ½×(T/2), half the time (T/2) allocated to the MSB. The second clock signal CK2 may be applied for ½×($T/2^3$), half the time ($T/2^3$) allocated to the MSB-2. The third clock signal CK3 may be applied for ($T/2^5$), the time allocated to the MSB-4. The fourth clock signal CK4 may be applied for ($T/2^{10}$), the time allocated to the LSB.

In the data-writing period DT of the second subframe SF2, the bit value of the n-bit data from the data driving unit 125 may be recorded in the memory 503 in the pixel PX. That is, the bit string (1101) of the second 4-bit data (B21 through B24) of FIG. 18 may be recorded in the memory 503 in the pixel PX.

In the light-emitting period ET of the second subframe SF2, the first through fourth clock signals CK1 through CK4 may be applied to the PWM controller 501 in synchronization with the 4-bit data, and the PWM controller 501 may generate a PWM signal based on the bit value of the 4-bit data recorded in the memory 503 and the first through fourth clock signals CK1 through CK4.

The first through fourth clock signals CK1 through CK4 of the second subframe SF2 may be each applied for a same time as a time allocated to each bit of the 4-bit data. For example, the first clock signal CK1 may be applied for ½×(T/2), half the time (T/2) allocated to the MSB. The second clock signal CK2 may be applied for ½×($T/2^3$), half the time ($T/2^3$) allocated to the MSB-2. The third clock signal CK3 may be applied for ($T/2^6$), the time allocated to the MSB-5. The fourth clock signal CK4 may be applied for ($T/2^9$), the time allocated to the MSB-8.

In the data-writing period DT of the third subframe SF3, the bit value of the n-bit data from the data driving unit 125 may be recorded in the memory 503 in the pixel PX. That is, the bit string (0101) of the third 4-bit data (B31 through B34) of FIG. 18 may be recorded to the memory 503 in the pixel PX.

In the light-emitting period ET of the third subframe SF3, the first through fourth clock signals CK1 through CK4 may be applied to the PWM controller 501 in synchronization with the 4-bit data, and the PWM controller 501 may generate a PWM signal based on the bit value of the 4-bit data recorded in the memory 503 and the first through fourth clock signals CK1 through CK4.

The first through fourth clock signals CK1 through CK4 of the third subframe SF3 may be each applied for a same time as a time allocated to each bit of the 4-bit data. For example, the first clock signal CK1 may be applied for ($T/2^2$), the time allocated to the MSB-1. The second clock signal CK2 may be applied for ($T/2^4$), the time allocated to the MSB-3. The third clock signal CK3 may be applied for ($T/2^7$), the time allocated to the MSB-6. The fourth clock signal CK4 may be applied for ($T/2^8$), the time allocated to the MSB-7.

The PWM controller 501 may generate the PWM signal (PWM) based on the clock signal CK output from the first through third subframes SF1 through SF3 and the bit value of the bit data. In each of the first through third subframes SF1 through SF3, the PWM controller 501 may control a pulse width of a PWM signal based on the bit value of the 4-bit data read from the memory 503 and a signal width of a corresponding clock signal CK.

Figure 20:
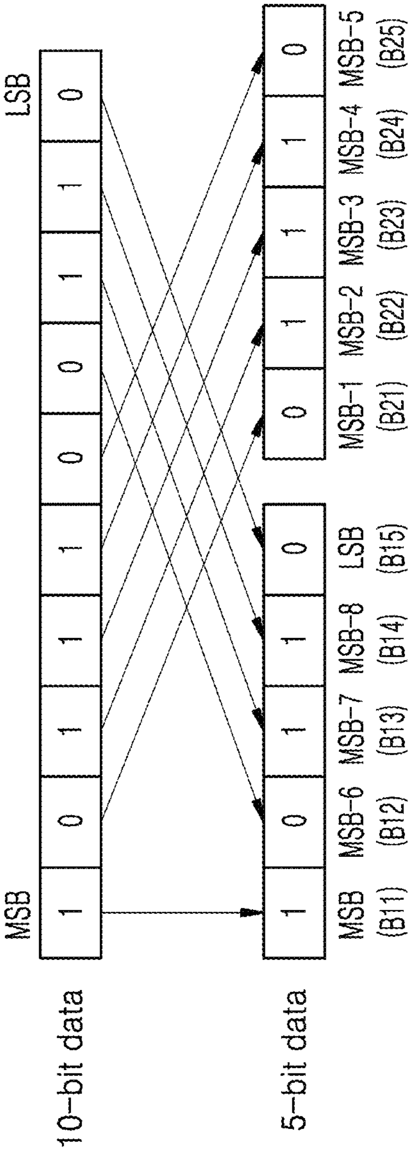
FIG. 20 is a diagram for describing bit data division according to another embodiment of the present disclosure.

FIG. 20 is a diagram for describing bit data division according to another embodiment of the present disclosure. FIG. 20 is a diagram for describing driving timing of a clock signal according to another embodiment of the present disclosure. FIG. 20 illustrates an example of driving timing of a clock signal applied to an arbitrary row.

Figure 21:
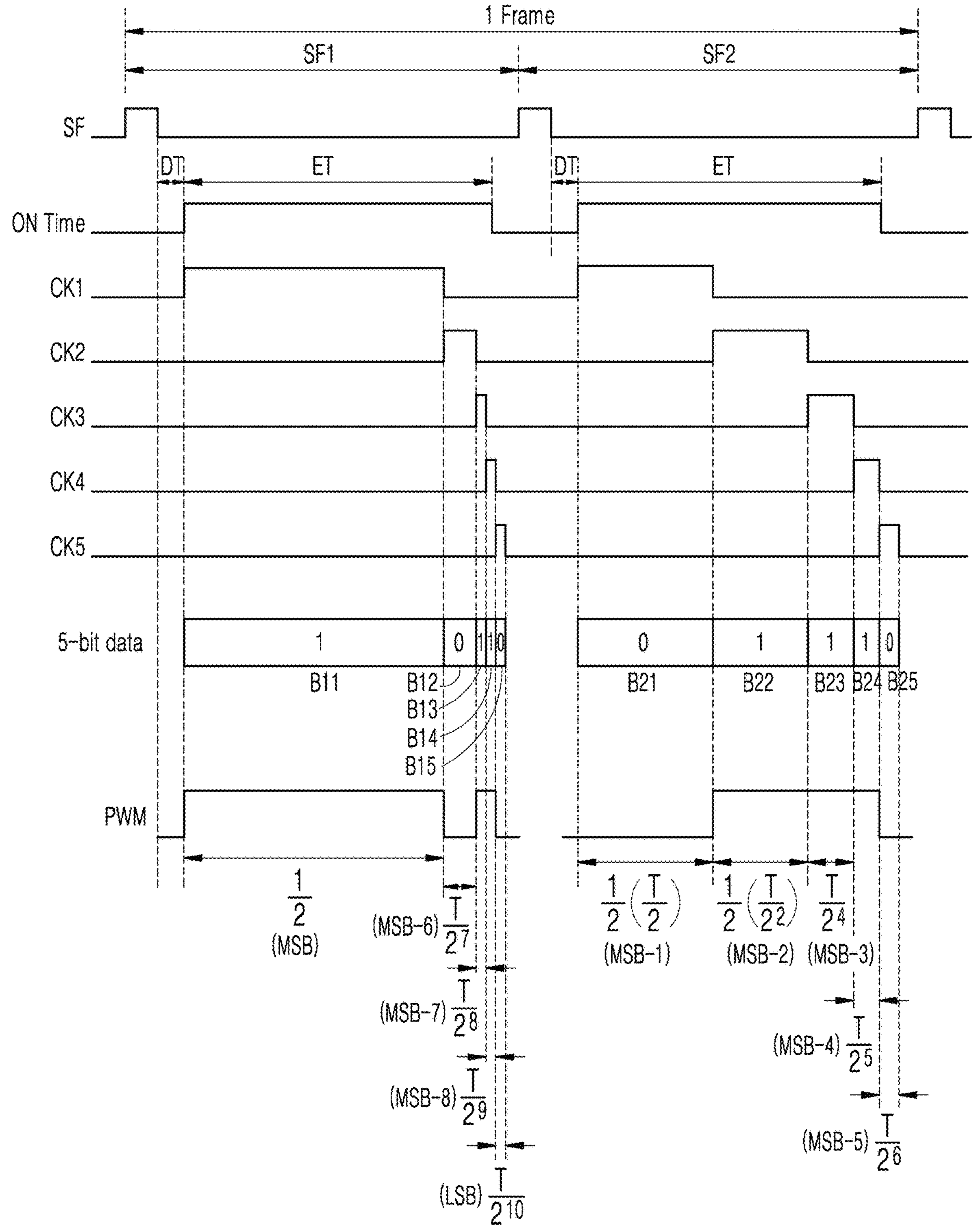
FIG. 21 is a diagram for describing driving timing of a clock signal according to another embodiment of the present disclosure.

In FIGS. 20 and 21, an example is illustrated, in which one frame includes two subframes and a PWM signal is generated by two pieces of 5-bit data generated by dividing 10-bit data in each subframe.

Referring to FIG. 20, in a bit string (1011100110) of 10-bit data (B1 through B10) of a pixel PX, 1, which is the leftmost bit (B1), is the MSB, and 0, which is the rightmost bit (B10), is the LSB. 10-bit data may be divided into two bit strings of 5-bit data. Bits may be combined such that a difference between a time of a first subframe SF1 and a time of a second subframe SF2, specifically, a difference between a light-emitting period ET of the first subframe SF1 and a light-emitting period ET of the second subframe SF2 is minimized.

First 5-bit data (B11 through B15) is a combination (10110) of MSB(B1)/MSB-6(B7)/MSB-7(B8)/MSB-8(B9)/LSB(B10) of 10-bit data. Second 5-bit data (B21 through B25) is a combination (01110) of MSB-1(B2)/MSB-2(B3)/MSB-3(B4)/MSB-4(B5)/MSB-5(B6) of 10-bit data.

The first 5-bit data (left) is image data of the first subframe SF1, and the second 5-bit data (right) is image data of the second subframe SF2.

Referring to FIG. 20, the pixel PX may be driven in a data-writing period DT and a light-emitting period ET for every subframe of a single frame. An ON time of the light-emitting period ET is a time of a subframe, and a time of the first subframe and a time of the second subframe may be different but approximate to each other.

In the data-writing period DT of the first subframe SF1, bit values of n-bit data from the data driving unit 125 may be recorded in the memory 503 in the pixel PX. That is, the bit string (10110) of the first 5-bit data (B11 through B15) of FIG. 20 may be recorded in the memory 503 in the pixel PX.

In the light-emitting period ET of the first subframe SF1, first through fifth clock signals CK1 through CK5 may be applied to the PWM controller 501 in synchronization with 5-bit data, and the PWM controller 501 may generate a PWM signal based on the bit value of the 5-bit data recorded in the memory 503 and the first through fifth clock signals CK1 through CK5.

The first through fifth clock signals CK1 through CK5 of the first subframe SF1 may be each applied for a same time as a time allocated to each bit of the 5-bit data. For example, the first clock signal CK1 may be applied for (T/2), the time allocated to the MSB. The second clock signal CK2 may be applied for ($T/2^7$), the time allocated to the MSB-6. The third clock signal CK3 may be applied for ($T/2^7$), the time allocated to the MSB-6. The fourth clock signal CK4 may be applied for ($T/2^8$), the time allocated to the MSB-7. The fifth clock signal CK5 may be applied for ($T/2^{10}$), the time allocated to the LSB.

In the data-writing period DT of the second subframe SF2, the bit value of the n-bit data from the data driving unit 125 may be recorded in the memory 503 in the pixel PX. That is, the bit string (01110) of the second 5-bit data of FIG. 20 may be recorded in the memory 503 in the pixel PX.

In the light-emitting period ET of the second subframe SF2, first through fifth clock signals CK1 through CK5 may be applied to the PWM controller 501 in synchronization with the 5-bit data, and the PWM controller 501 may generate a PWM signal based on the bit value of the 5-bit data recorded in the memory 503 and the first through fifth clock signals CK1 through CK5.

The first through fifth clock signals CK1 through CK5 of the second subframe SF2 may be each applied for a same time as a time allocated to each bit of the 5-bit data. For example, the first clock signal CK1 may be applied for ($T/2^2$), the time allocated to the MSB-1. The second clock signal CK2 may be applied for ($T/2^3$), the time allocated to the MSB-2. The third clock signal CK3 may be applied for ($T/2^4$), the time allocated to the MSB-3. The fourth clock signal CK4 may be applied for ($T/2^5$), the time allocated to the MSB-4. The fifth clock signal CK5 may be applied for ($T/2^6$), the time allocated to the MSB-5.

The PWM controller 501 may generate the PWM signal (PWM) based on the clock signal CK output from the first subframe SF1 and the second subframe SF2 and the bit value of the bit data. In each of the first subframe SF1 and the second subframe SF2, the PWM controller 501 may control a pulse width of a PWM signal based on the bit value of the 5-bit data read from the memory 503 and a signal width of the clock signal CK.

In the embodiments of FIGS. 16 through 21, when a bit value is 1, the PWM controller 501 may output a pulse having a pulse width corresponding to a signal width of a clock signal CK. When a bit value is 0, the PWM controller 501 may not output a pulse corresponding to a signal width of a clock signal CK. In another embodiment, when a bit value is 1, the PWM controller 501 may not output a pulse corresponding to a signal width of a clock signal CK, and when a bit value is 0, the PWM controller 501 may output a pulse having a pulse width corresponding to a signal width of a clock signal CK.

The luminous element ED may emit light or may not emit light during a single frame according to the pulse output of the PWM signal. The luminous element ED may emit light for a time corresponding to the pulse width when the pulse output is turned on. The luminous element ED may not emit light as long as the pulse output is turned off.

An embodiment of the present disclosure may be implemented as a micro LED display device. Recently, as the need for a micro display device as a new display device increases, the development of micro LED on silicon or AMOLED on silicon that forms LEDs on silicon is on the rise, and the demand for power consumption reduction in portable display devices is expected to increase.

In the embodiments of the present disclosure, a memory is provided in a pixel to enable current driving, and in the case of a still image, the driving unit only needs to transmit a simple driving pulse to the pixel unit, and thus, power consumption may be improved.

In the embodiments of the present disclosure, a target gamma value may be set through digital processing, and luminance may be easily adjusted using the current mirror circuit while the set gamma value is maintained.

In the embodiments of the present disclosure, a high-resolution display device can be implemented with a circuit configuration mainly based on a low voltage transistor.

In the present specification, the present disclosure has been described through limited embodiments, but various embodiments are possible within the scope of the present disclosure. Also, although not explained, it will be said that an equal means is also directly coupled to the present disclosure. Therefore, the true scope of protection of the present disclosure should be determined by the following claims.

The invention claimed is:

1. A pixel driving circuit electrically connected to a luminous element, the circuit comprising:
   - a first circuit configured to control light-emission and non-emission of the luminous element in response to a control signal applied to each of a plurality of sub-frames included in a frame,
   - a second circuit configured to store bit values of multi-bit data in the frame, and generate the control signal based on the stored bit values and a clock signal such that each subframe included in the frame is controlled according to each bit value, and
   - wherein each of the plurality of subframes includes a data-writing period and a light-emitting period,
   - during the data-writing period of each subframe, the second circuit receives and stores a corresponding bit string from among a plurality of bit strings of n-bit data, wherein the plurality of bit strings are generated by a combination of bits in the number of n, which is smaller than m, from among m bits constituting a bit string of the multi-bit data, and
   - the n-bit data is a bit string in which n bits from among the m bits are combined such that a difference in light-emitting periods of the plurality of subframes is minimized.

2. The pixel driving circuit of claim 1, wherein
   - n is (m/2)+1 or (m/2)−1, and
   - two bit strings from among the bit strings of the n-bit data include, as a common bit, at least one bit of the bit string of the m-bit data, and a time allocated to the common bit is half a time allocated to the at least one bit in the bit string of the m-bit data.

3. The pixel driving circuit of claim 1, wherein n is m/2,
   - the bit strings of the n-bit data do not include bits at the same positions among the m bits, and
   - sums of time allocated to each bit of the respective bit strings of the n-bit data are approximate to one another.

4. The pixel driving circuit of claim 1, wherein the first circuit includes
   - a first transistor configured to output a driving current and
   - a second transistor configured to transmit or block the driving current to the luminous element according to the control signal.

5. The pixel driving circuit of claim 4, wherein the first circuit includes a level shifter that converts a voltage level of the control signal.

6. The pixel driving circuit of claim 1, wherein the second circuit includes
   - a memory configured to store the bit values of the multi-bit data and
   - a pulse width modulation (PWM) controller configured to read the bit values from the memory and determine a pulse width of the control signal for a subframe based on a length of the subframe and a bit value corresponding to the subframe.

7. A display device comprising:

a pixel unit including a plurality of pixels, each including a luminous element and a pixel circuit connected to the luminous element;

a current supply unit configured to supply a driving current to the plurality of pixels; and a clock generator configured to supply a clock signal to the plurality of pixels when each of a plurality of subframes constituting a frame starts, wherein the pixel circuit of each pixel includes a first circuit configured to control light-emission and non-emission of the luminous element in response to a control signal applied to each of a plurality of subframes included in a frame, a second circuit configured to store bit values of multi-bit data in the frame, and generate the control signal based on the stored bit values and a clock signal such that each subframe included in the frame is controlled according to each bit value, and wherein the each of the plurality of subframes includes a data-writing period and a light-emitting period, during the data-writing period of each subframe, the second circuit receives and stores a corresponding bit string from among a plurality of bit strings of n-bit data, wherein the plurality of bit strings are generated by a combination of bits in the number of n, which is smaller than m, from among m bits constituting a bit string of the multi-bit data, and the n-bit data is a bit string in which n bits from among the m bits are combined such that a difference in light-emitting periods of the plurality of subframes is minimized.

* * * * *